July 23, 1957

H. G. ALLEN 2,799,861

CARTON-SEALING MACHINE

Filed July 26, 1954

INVENTOR:
Howard G. Allen
BY
ATTORNEYS.

INVENTOR:
Howard G. Allen
BY
ATTORNEYS.

July 23, 1957  H. G. ALLEN  2,799,861
CARTON-SEALING MACHINE

Filed July 26, 1954  11 Sheets-Sheet 5

INVENTOR:
Howard G. Allen
BY
ATTORNEYS.

July 23, 1957 H. G. ALLEN 2,799,861
CARTON-SEALING MACHINE
Filed July 26, 1954 11 Sheets-Sheet 6

INVENTOR:
Howard G. Allen
BY
ATTORNEYS.

INVENTOR:
Howard G. Allen
BY
ATTORNEYS.

INVENTOR:
Howard G. Allen
BY
ATTORNEYS.

July 23, 1957

H. G. ALLEN 2,799,861

CARTON-SEALING MACHINE

Filed July 26, 1954

INVENTOR:
Howard G. Allen
BY
ATTORNEYS.

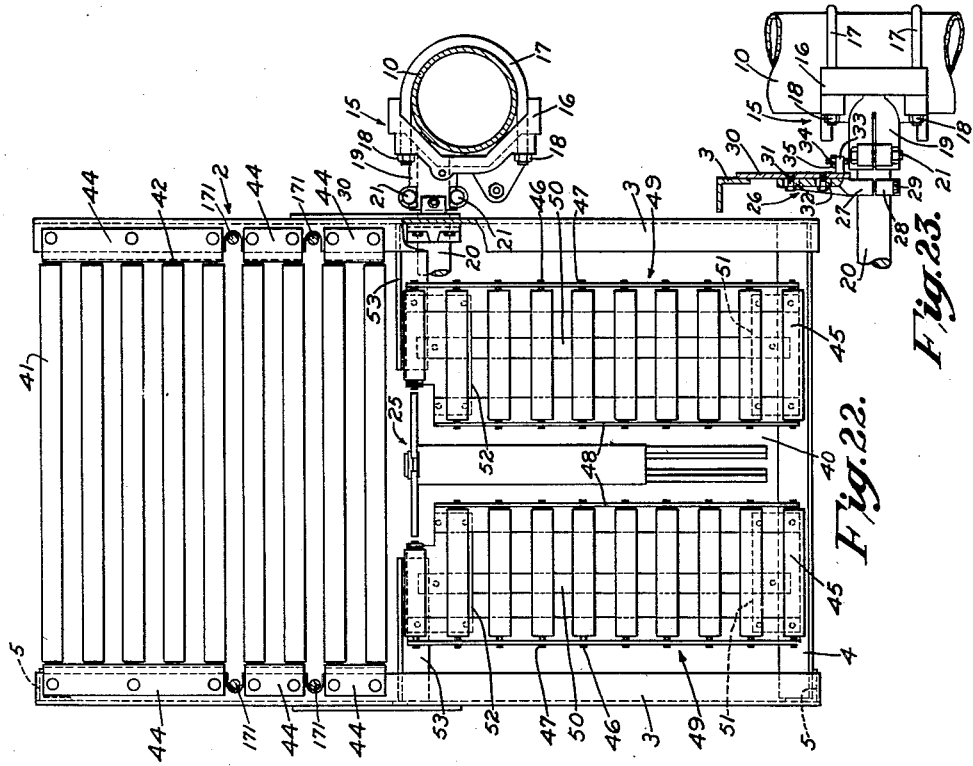

July 23, 1957  H. G. ALLEN  2,799,861
CARTON-SEALING MACHINE
Filed July 26, 1954  11 Sheets-Sheet 11

INVENTOR:
Howard G. Allen
BY
ATTORNEYS.

United States Patent Office 2,799,861
Patented July 23, 1957

2,799,861

CARTON-SEALING MACHINE

Howard G. Allen, Stonington, Conn., assignor to Bostitch, Inc., Stonington, Conn., a corporation of Rhode Island Application July 26, 1954, Serial No. 445,581

20 Claims. (Cl. 1—101)

This invention relates to machines for sealing closed containers such as corrugated fiberboard cartons or the like by applying staples to the folded flaps or other closure parts to secure them in place.

One object of the invention is to provide a machine embodying one or more stapling- or stitcher-heads for applying staples to the closures of a container by driving them therethrough and clinching them on the inside of the container, with means for automatically actuating the stitcher-head or heads as a container is fed into position for operation thereon by the stapling mechanism.

Another object is to provide a machine having dual stitcher-heads, one positioned to operate on the upper part or top of the container and another head located therebeneath for stapling the closures on the bottom of the container.

Another object is to provide a machine of the type indicated having means for alternately lowering and raising the upper stitcher-head to adapt it to intermittently apply staples to the closures on the top of the container as said container is fed therebeneath and staples are applied on its under side by the lower head.

Another object is to provide means for supporting the containers to feed beneath the upper stitcher-head, and means for engaging against the sides of a container to locate and hold it in position for operation thereon by both heads.

Another object is to provide means operated automatically by the lowering of the upper stitcher-head into contact wtih a container or carton for starting the operation of the stitching mechanism to apply the staples to the folded flaps of the carton.

Another object is to provide means for releasing the locating and holding means from the container after each cycle of operation of the stapling mechanism and simultaneously raising the upper stitcher-head slightly thereabove to adapt the container to be fed forwardly therebeneath.

Another object is to provide a machine of the present type having a table for supporting containers thereon to be fed therealong either manually or by automatic feeding means for applying a series of staples thereto on the top and bottom thereof.

Further objects of the invention are set forth in the following specification which describes one preferred form of construction of a machine, by way of example, for accomplishing the objects herein mentioned as illustrated by the accompanying drawings. In the drawings:

Fig. 22 is a plan view of the carton-supporting table showing the arrangement of the feed-rollers to provide an opening through which the lower stitcher-head may apply the staples;

Fig. 23 is a detailed elevational view showing the means for supporting one side of the feed-table from the vertical column;

Fig. 25 is a wiring diagram showing the several branch electrical circuits, switches, relays, and solenoids for controlling the operation of the complete machine.

In general, the present automatically-operated container-sealing machine comprises a support for the containers which may be in the form of a table having rollers for adapting the containers to slide thereon, or in other cases traveling conveyor-belts, not shown herein; a stitcher-head underlying the top of the table for operation through an opening therein; a column rising above the table for movably supporting an upper stitcher-head adapted to be lowered against the top of a container on the table; an actuator or trip-lever for contacting the top of the container to initiate the operation of both stitcher-heads, or the upper one singly if so desired; a continuously running motor for each stitcher-head; clutch-means for connecting said motors to operate the staple-applying means in said heads; mechanical means for actuating the clutches; solenoids for operating said mechanical actuating means; switches in the circuits to said solenoids; and means for automatically closing said switches to energize the solenoids in predetermined order for controlling the operation of the various mechanisms of the complete machine.

Figures 1, 21:
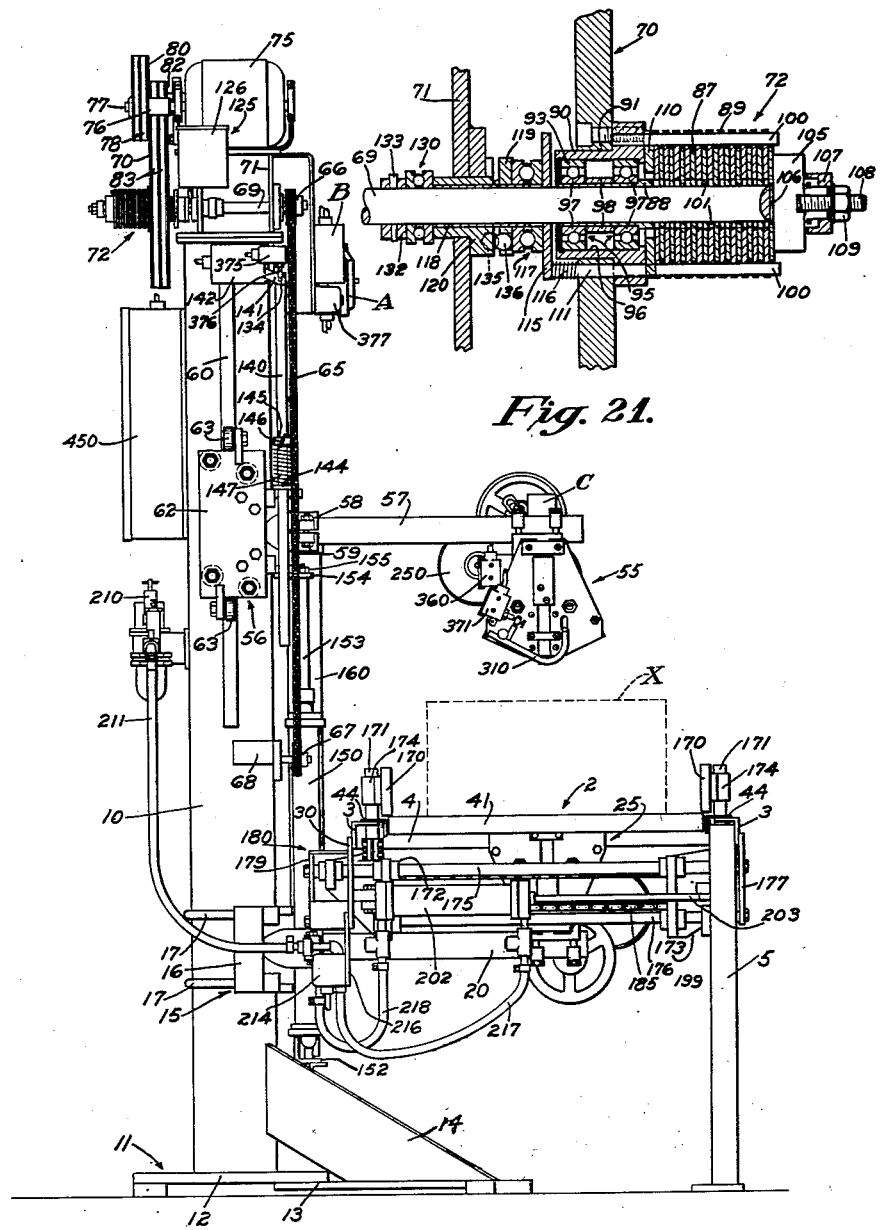
Fig. 1 is a front elevational view of the complete machine showing a pair of stapling units or stitcher-heads mounted respectively above and below a table on which the containers may be fed into position to be stapled.
Fig. 21 is a vertical sectional view through the clutch-means for connecting the motor to drive the lifting-means for the upper head.
Figure 2:
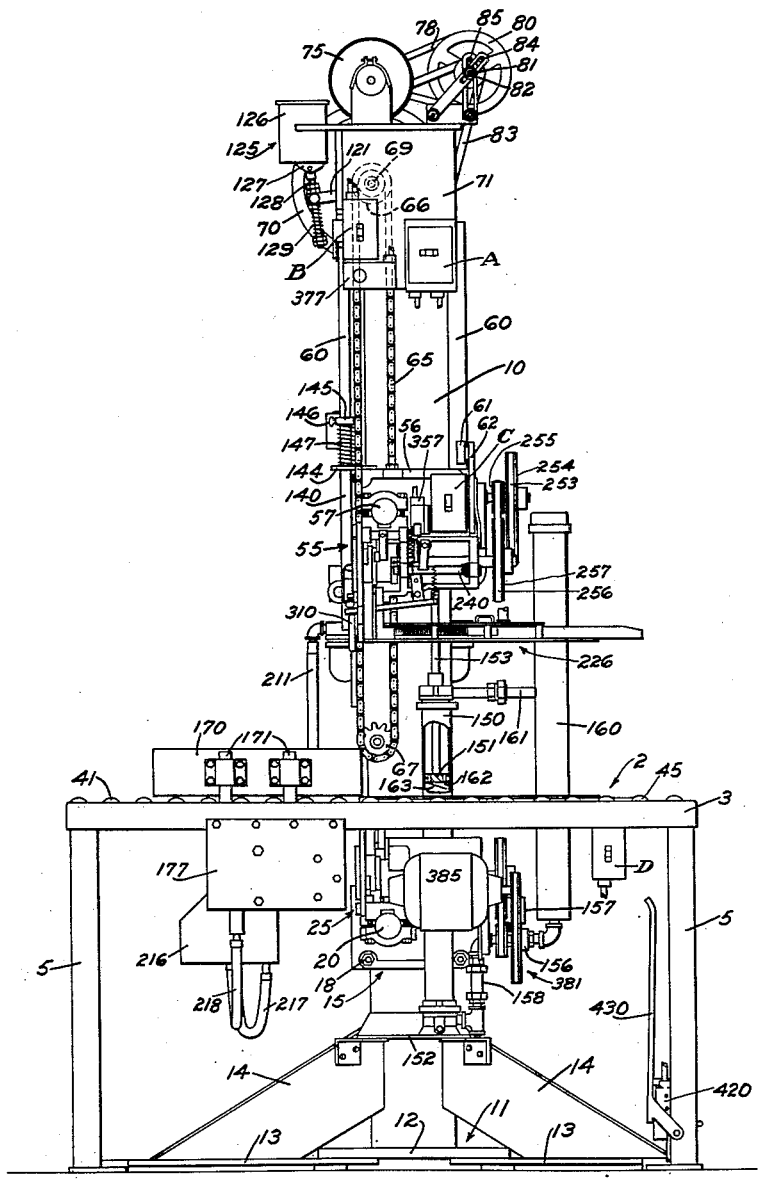
Fig. 2 is a side elevation of the same.

Referring to Figs. 1 and 2 of the drawings, a table 2 is adapted to support the containers to feed therealong for applying a series of staples to the top and bottom flaps thereof by means of dual stitcher-heads; one mounted below and the other above the table. The table 2 may consist of a bed or platform constructed as a framework of angle-iron having horizontal side rails 3 and an end rail 4. Two legs 5 support one side of the table 2 at opposite ends thereof while the opposite side of the table is supported from a vertical column 10 mounted on a pedestal 11. The pedestal 11 may comprise suitable overlapping plates 12 and 13 with radially-extending members 14 for bracing the column above its base. The means for supporting one side of the table 2 from the column 10 consists in a bracket 15 (Figs. 22 and 23) having a bifurcated portion 16 joined to looped rods 17 encircling the column with their ends engaging through holes in the bracket and secured thereto by nuts 18. The bracket 15 is constructed with a laterally-projecting split bearing 19 for supporting a horizontal arm in the form of a rod 20 held in the bearing by clamping its split portion therearound with bolts 21. The arm or rod 20 provides means for supporting the lower stitcher-head 25 beneath the top of the table 2 in accordance with the arrangement later described. The rod 20 also serves as the means for supporting the side of the table 2 from the column 10. As shown in Fig. 23, an upright plate-like member 26 is formed with a bearing portion 27 shaped to overlie and partly encircle the top of the rod 20 with a lower clamping portion 28 engaging around the bottom of the rod with suitable bolts 29 for fastening the parts together to fixedly secure the member 26 in place. Abutting the side of the upright member 26 above the rod 20 is a plate 30 adjustably secured thereto by means of bolts 31 passing through elongated slots 32 in said member. A lug 33 projects from the side of the plate 30 with a set-screw 34 therein engaging against the bearing 19 of the bracket 15. A check-nut 35 engaging the threads of the screw 34 is seated against the lug 33 to lock said screw from turning. The plate 30 forms the support for the side of the table 2, being fastened at the top to the angle-iron side rail 3, previously mentioned. Through this arrangement, by loosening the bolts 31 the set-screw 34 may be turned for raising or lowering the plate 30 to thereby adjust the height of one side of the table 2 for leveling it.

The top of the table 2 may be provided with suitable rollers adapted to support the cartons for feeding them therealong into operative relationship with the stitcher-heads that apply the staples to the top and bottom closures; it being noted that a portion of the table top is provided with an opening at 40 above the stitcher-head 25 to adapt the latter to drive the staples upwardly therethrough for insertion into the flaps on the bottom of the carton. The rollers 41 of one set extend substantially the full width of the table 2 with their end-journals 42 supported in holes in suitable angle-irons 44 overlying the side rails 3. Located at either side of the opening 40 in the top of the table 2 are two series of shorter rollers 45 having their end-journals 46 held in bearings 47 constituted by holes in angle-iron side strips 48. The angle-iron strips 48 at either side of the opening 40 form rectangular frameworks 49 supported from the side rails 3 and end rail 4 of the table 2. For this purpose the angle-iron strips 48 are connected by longitudinally-extending flat strips 50 fastened at their ends to plates 51 and 52. The plates 51 are fastened to and supported on the end member 4 of the table 2 while the plates 52 are similarly supported by angle-irons 53 projecting from the opposite side strips 3. It will be noted that each framework 49 is narrowed at the end adjacent the full length rolls 41 so that the end roller of each set of shorter rollers 45 is of still less length to provide a wider opening at this end of the main opening 40 for accommodating the clincher-means of the lower stitcher-head 25 as later explained.

Figure 19:
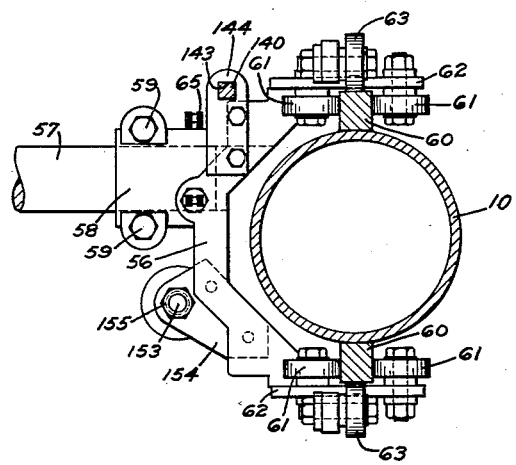
Fig. 19 is a detailed view of the carriage for movably supporting the upper stitcher-head on the vertical column showing the track on the column and the roller guiding means for mounting the carriage to slide up and down on the column.

The upper stitcher-head 55 is arranged to travel vertically on the column 10 to adapt it to be lowered into contact with the top of a container or carton on the table 2, the head being mounted on a slidable carriage 56 (Figs. 1 and 19) embodying a horizontally-projecting arm 57 from which the head is suspended. The carriage 56 is formed with a bifurcated portion, similar to that of the lower bracket 15 previously described, which straddles the column 10 and a split-bearing portion 58 clamped to the arm or rod 57 by bolts 59. Fastened to the opposite sides of the column 10 by welding or otherwise are rails 60 engaged at either side by rollers 61 journaled on vertical plates 62 carried by the forked portion of the carriage 56. Additional rollers 63 engage the outer sides of the rails 60 as shown most clearly in Fig. 19. By this means the upper stitcher-head 55 is mounted for traveling up and down on the column 10 under the control of a substantially continuous looped chain 65 having its end portions fastened to the carriage 56 in any suitable manner.

The chain 65 extends around an upper drive-sprocket 66 with its opposite parallel lengths reaching downwardly around an idler-sprocket 67 suitably journaled on a bearing bracket 68 fastened to the side of the column 10. The upper stitcher-head 55 may be raised above the table 2 by traveling the chain 65 to slide the carriage 56 upwardly through rotation of the upper drive-sprocket 66. The sprocket 66 is mounted fast on a shaft 69 carrying a drive-pulley 70 at its opposite end for rotating said shaft. The shaft 69 is journaled in suitable bearings in a framework 71 at the top of the column 10 (Fig. 1) with the pulley 70 normally free to rotate on said shaft and adapted to be drivingly connected thereto by means of a multiple-plate clutch 72, shown in detail in Fig. 21. An electric motor 75 mounted on the framework 71 at the top of the column 10 and driven continuously when the complete machine is operating has a belt-pulley 76 on the end of its shaft 77 connected by a pair of V-belts 78 to an intermediate pulley 80 fast on a countershaft 81. The shaft 81 carries a smaller pulley 82 connected by a pair of belts 83 to the driving pulley 70 on the shaft 69, previously described as carrying the chain-driving sprocket 66. Preferably, the shaft 81 for the pulley 80 is mounted for adjustment both outwardly and upwardly with respect to the driving pulley 76 for regulating the tension of the several belts 78 and 83, the bearings for the shaft being slidable in slotted members 84 and 85 (Fig. 2) mounted above the framework 71.

Referring to Fig. 21, the clutch 72 may be of any preferred type and, as herein shown, it comprises a plurality of driving disks 87 keyed to a longitudinally slitted sleeve 88 on the sprocket-driving shaft 69 and arranged in series with alternate disks 89 of greater diameter free to rotate on the sleeve. A flanged hub 90 fast in a bore 91 in the web of the driving pulley 70 forms a cage containing the outer races 93 of a pair of ball-bearings 95 which are fast in the bore 96 of the hub 90. The inner races 97 of the bearings 95 are mounted on a reduced portion of the sleeve 88 with a spacing washer 98 therebetween; it being noted that this last-mentioned length of the sleeve 88 is not slitted into sections as is that portion carrying the clutch-plates.

Four equally-spaced pins 100 having their ends fixedly held in holes in the flange of the hub 90 project axially therefrom through holes adjacent the rims of the disks 89 for connecting said disks to turn as a unit on the sleeve 88. The plates or disks 89 are adapted to be frictionally engaged with the alternating driven disks 87 which are keyed to the sleeve 88 by means of lugs 101 projecting into the openings between the split sections of the sleeve. A flat plate-like key 105 set into a slot 106 in the end of the shaft 69 serves as an abutment engaging the end disk 87 on the shaft 69 to take the thrust of the whole series of disks when they are forced into frictional engagement for rotating the shaft. A collar 107 on the end of the shaft 69 is counterbored to engage the end of the sleeve 88 and a stud 108 screwed into the end of the shaft with its end engaging in a slot in the key 105 serves as a means for adjusting the key in axial position to regulate the lateral displacement of the disks as they are carried into and out of frictional engagement. A nut 109 on the stud 108 bears against the end of the collar 107 to hold it in place and resist the end thrust of the split sleeve 88. A relatively thick thrust-disk 110 abuts the end of the flange on the hub 90 and serves as the movable element for sliding the disks 87 and 89 to frictionally engage their faces and drivingly connect the pulley 70 to rotate the shaft 69.

Figure 20:
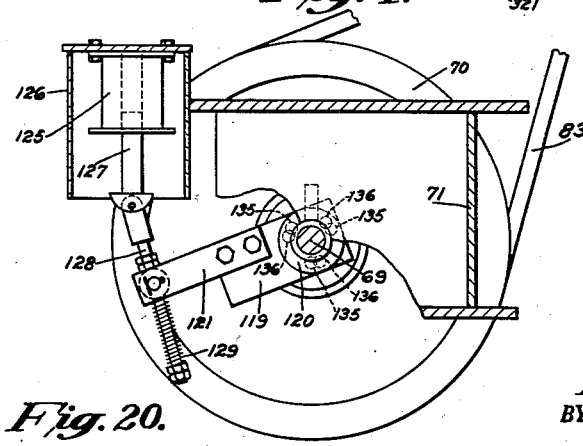
Fig. 20 is a detailed view of the solenoid-operated means for engaging the clutch to connect the motor to operate the lifting means for the upper stitcher-head.

Three pusher-pins 111 equally spaced around the hub 90 are slidable through holes in the web of the pulley 70 and alining holes in the flange of the hub 90. The forward ends of these pins 111 engage the side of the thrust-disk or element 110 while their rearward ends are engaged by a pusher-plate or disk 115 free to slide on the shaft 69 and normally spaced a slight distance rearwardly from the end of the hub 90. Helically coiled springs 116 surround the pusher-pins 111 between the pusher-plate 115 and the flange of the pulley 70, thereby tending to hold the pusher-plate spaced rearwardly from the hub 90. A ball-bearing thrust-collar 117 journaled on a bushing 118 on the shaft 69 is located at one side of the pusher-plate 115 to take the thrust of the latter under the force of the springs 116. At the opposite side of the thrust-element 117 is a plate-like arm 119 cooperating with a ball-clutch annulus 120, the arm carrying a lever 121 (Fig. 20) fastened thereto which is operative by a solenoid 125 held in a casing 126 on the framework 71 at the top of the column 10. When the solenoid 125 is energized it attracts its armature 127 connected to a rod 128 carrying a spring 129 for resiliently connecting it to the lever 121 fastened to the arm 119. The hub of the clutch-annulus 120 is journaled in a bore in the side plate of the framework 71 with a ball-bearing thrust-washer 130 at its end held by a collar 132 pinned to the shaft 69 at 133. Three relatively large balls 135 located in pockets in the face of the clutch-annulus 120 are arranged to engage with a corresponding number of balls 136 (Fig. 21) slidable through holes in the arm 119 to force them against the thrust-collar 117 and slide the latter axially of the shaft 69, the arrangement of the balls being in accordance with a usual type of clutch used in different arts. The axial displacement of the thrust-collar 117 operates to force the pusher-plate 115 to the right, as viewed in Fig. 21, thereby causing the pusher-pins 111 to slide the thrust-element 110 to the right for frictionally engaging the disks 87 and 89 to clutch the pulley 70 to the shaft 69 for driving the later from the motor 75. The solenoid 125 is energized from a branch circuit to actuate the lever 119 for clutching the pulley 70 to the shaft 69 and thereby rotate the sprocket 66 for raising the upper stitcher-head 55 by traveling the chain 65. The circuit to the solenoid 125 includes certain electrical elements described later with reference to the wiring diagram, Fig. 25.

The upward travel of the carriage 56 for lifting the stitcher-head above the table 2 may be arrested in certain instances by means next described. The shaft 69 is driven from the motor 75 by the belt-pulleys previously described when the pulley 70 is clutched to said shaft as described above. Extending parallel with the chain 65 adjacent one length thereof (Figs. 1 and 2) is a vertical rod 140, preferably of rectangular cross-section, which is pivotally attached at its upper end to a lever 141 for actuating a switch 142 in circuit with the solenoid 125 for actuating the clutch 72. The rod 140 reaches downwardly through a hole 143 in a plate 144 (Fig. 19) attached to the forked portion of the carriage 56 at one side thereof. Mounted on the rod 140 is a collar 145 adapted for adjustment longitudinally thereof by means of a thumb-screw 146. Slidable on the rod 140 below the collar 145 is a helical spring 147. As the carriage 56 rises along the column 10 the plate 144 carried thereby slides the spring 147 upwardly into engagement with the collar 145 to contract and load the spring 147. The rod 140 is thus slid upwardly to rock the lever 141 and open the switch 142 for de-energizing the solenoid 125 (Fig. 20) which controls the clutch 72. The pulley 70 will therefore be declutched from the shaft 69 carrying the sprocket 66 so that travel of the chain 65 is arrested and the stitcher-head 55 brought to rest at some distance above the table 2. It should be explained that the means for arresting the upward motion of the stitcher-head 55 as last described is in the nature of a precautionary or safety device, the "limit" switch 142 not being used during normal operation of the machine but a time-relay being provided in the circuit to the clutch-operating means for regulating the extent of lift of the head 55 above the container to free the trip-lever which functions to control the descent of the head.

After single staples have been applied to the top and bottom of a container the stitcher-head 55 is raised thereabove to only a slight extent so that the container may be fed forwardly to apply another staple spaced from the first one and so on. For applying the staples successively in closely spaced relationship the stitcher-head is lowered against the container immediately after the latter is fed forwardly, the descent of the carriage 56 being controlled by hydraulic means as next described. Extending upwardly alongside the column 10 is a relatively long cylinder 150 containing a piston 151. The cylinder 150 is supported at its base by a bracket 152 fastened to the members 14 at the base of the pedestal 11. The piston-rod 132 extends upwardly from the cylinder 150 with its upper extremity reduced to project through a hole in a plate 154 (Fig. 1) on the under side of the carriage 56 (Fig. 19) being fastened to the plate by a nut 155. The descent of the carriage 56 and thereby the stitcher-head 55 under the force of gravity is controlled by a one-way valve 156 operated by a solenoid 157 in circuit with a switch later described. Upon opening the valve 156 the hydraulic fluid is forced through a restricted passage therein to flow from the bottom of the cylinder 150 (Figs. 1 and 2) through piping 158 connected with the bottom of a standpipe 160 which forms a reservoir for the fluid. The piston 151 slides down in the cylinder 150 during the descent of the stitcher-head 55 to retard and cushion its descent when the drive-pulley 70 is declutched from the shaft 69 to permit the sprocket 66 to rotate. The reservoir 160 is connected to the cylinder 150 by a by-pass pipe 161 for feeding the fluid back into the upper end of the cylinder as the piston 151 descends therein.

The piston 151 is provided with openings 162 to adapt the fluid to flow therethrough during its upward stroke, a flap-valve 163 on its under side acting to close said openings during its descent.

The means for centering the containers on the table 2 to aline them in proper relation to the stitcher-heads for driving the staples through the top and bottom flaps thereof is arranged as next described. Horizontal pressure-bars 170 (Figs. 1, 2 and 18) are mounted at opposite sides of the table 2 on rods 171 projecting upwardly from carriages 172 and 173 slidably supported to move toward each other. The rods 171 are held in bearings formed on the carriages 172 and 173 with the pressure-bars 170 attached to their upper ends by clamps 174 encircling the rods and bolted to the bars at the rear. The carriages 172 and 173 are mounted to slide on horizontal ways comprising an upper cylindrical rod 175 and a lower parallel square rod 176, each supported at one end by a plate 177 bolted to and depending from the side rail 3, the ends of said rods having threaded portions inserted through holes in said plate and fastened thereto by nuts 178. The opposite ends of the rods 175 and 176 are similarly held in the vertical wall 179 of a casing 180 mounted on the side of the plate 30, previously mentioned as forming part of the support for one side of the table 2. The carriages 172 and 173 are propelled toward each other along the rods 175 and 176 by means of an endless chain 185 engaging around sprockets 186 and 187 having their shafts 188 journaled in suitable bearings 189 and 190 bolted to the upright plates 30 and 177.

The upper reach of the chain 185 is fastened to the carriage 172 by a clamping element 195 bolted thereto, while the lower reach of the chain is fastened to the carriage 173 by a clamping element 196. It will thus be apparent that when the upper length of the chain is moved to the right and the lower chain to the left, as viewed in Fig. 18, the two carriages 172 and 173 will be drawn together; whereas, when the chain is traveled in the opposite direction the two carriages will be caused to recede from the center of the table 2 and away from the sides of a container or carton of any particular size. In order to regulate the extent of separation of the carriages 172 and 173 and thereby the bars 170 carried thereby, a stop-member 199 (Fig. 18) is adjustably mounted on the lower rod 176 on which the carriages slide. A thumb-screw 200 in the stop-member 199 is formed with a reduced end adapted to engage in holes in the bottom of the rod 176 to clamp the stop-member in adjusted position so that the carriage 172 will engage thereagainst to arrest the receding movement of the two carriages.

The chain 185 is traveled in opposite directions to thereby slide the carriages 172 and 173, respectively, toward and away from each other by means of a pneumatically-actuated piston 201 slidable in a cylinder 202. A rod 203 connected to the piston 201 projects through a stuffing-box in the end of the cylinder 202 with its free end connected to the carriage 172 by means of a bolt 204 extending through a hole 205 in the flattened end of the piston rod. The rearward end of the cylinder 202 is supported by an abutment 206 on the plate 30, a bolt 207 projecting through an ear or lug 208 on the end of the cylinder being screwed into the abutment.

Figure 18:
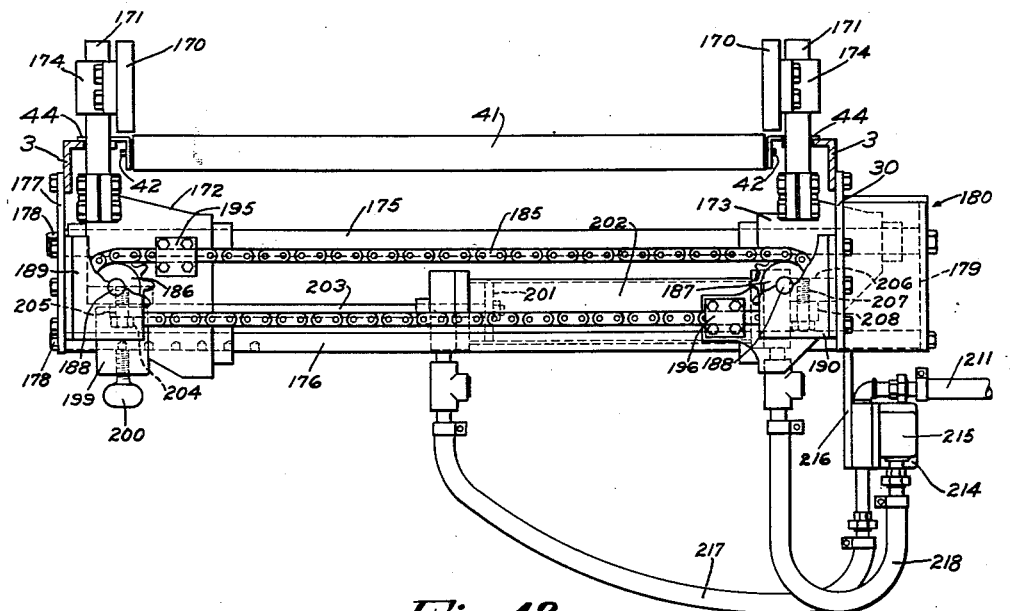
Fig. 18 is a side elevational view of the pneumatically-operated means for traversing the carton-engaging members toward each other crosswise of the table for locating and holding the carton in position to receive staples applied by the stitcher-heads.

Compressed air is supplied to the cylinder 202 through a system of piping (Figs. 1 and 18) connected to a suitable source of supply not herein shown. The air feeds through a manually-adjustable pressure-control valve 210 mounted on the side of the column 10 with a hose 211 leading downwardly therefrom to a four-way valve 215 on a plate 216 depending from the plate 30. The valve 215 is operated by a solenoid 214 as later explained. From the valve 215 a pipe or hose 217 leads to the outer end of the cylinder 202 with a second hose 218 communicating with the opposite end of said cylinder. Referring to Fig. 18, when air is admitted through the hose 217 to the outer end of the cylinder 202 it will force the piston 201 inwardly thereof to move the carriage 172 toward the right, as viewed in Fig. 18, thereby traveling the upper reach of the chain 185 in the same direction with its lower reach moving in the opposite direction to travel the carriage 173 towards the left. During this travel of the carriages 172 and 173 toward each other the pressure-bars 170 will be moved into contact with the sides of a carton on the table 2 to centralize it in proper relation to the upper and lower stitcher-heads and retain it in this position under yielding pressure while staples are applied to the top and bottom of the container. When an operative cycle of each stitcher-head is completed to apply single staples at the top and bottom of the carton the valve 215 is actuated to reverse the pressure in the cylinder 202 and the piston 201 will be moved to the left, as viewed in Fig. 18, to slide the carriages apart until the carriage 172 brings up against the stop-element 199 in whatever position the latter is adjusted for causing the pressure-bars 170 to recede slightly from the sides of the container. The direction of application of the pressure in the cylinder 202 is reversed under the automatic control of the four-way valve 215 with its solenoid supplied with current from the branch circuit shown in the wiring diagram (Fig. 25) and later described; it being sufficient to note here that the pressure-bars 170 engage the sides of the container just prior to the application of the staples thereto and are released therefrom upon completion of each cycle of operation of the stitcher-heads to provide for feeding the container forwardly intermittently in steps to properly space the staples along the top and bottom of the carton.

Figure 3:
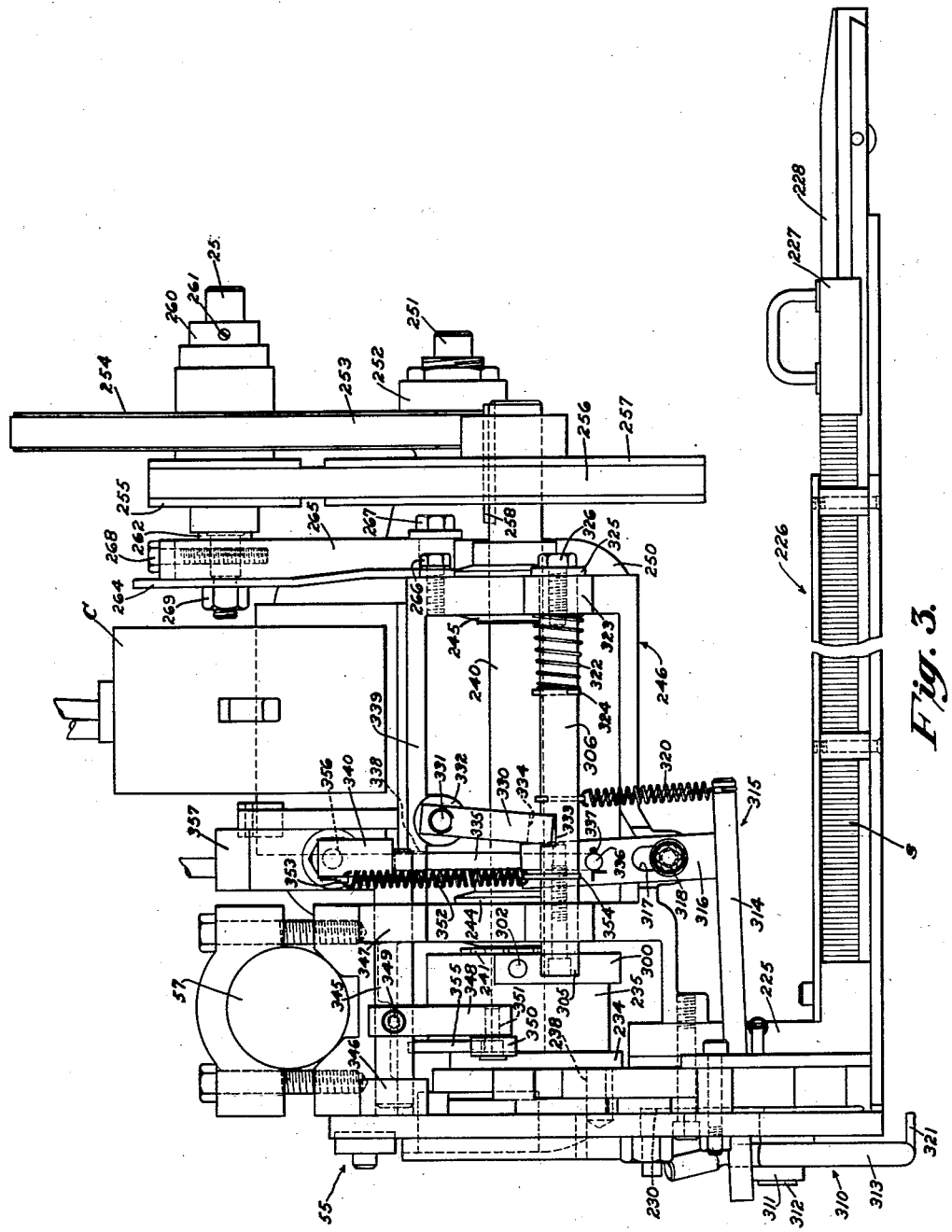
Fig. 3 is an enlarged side elevational view of the upper stitcher-head or stapling unit showing its driving connections and a portion of the mechanism for automatically starting the operation of the staple-applying means.
Figure 4:
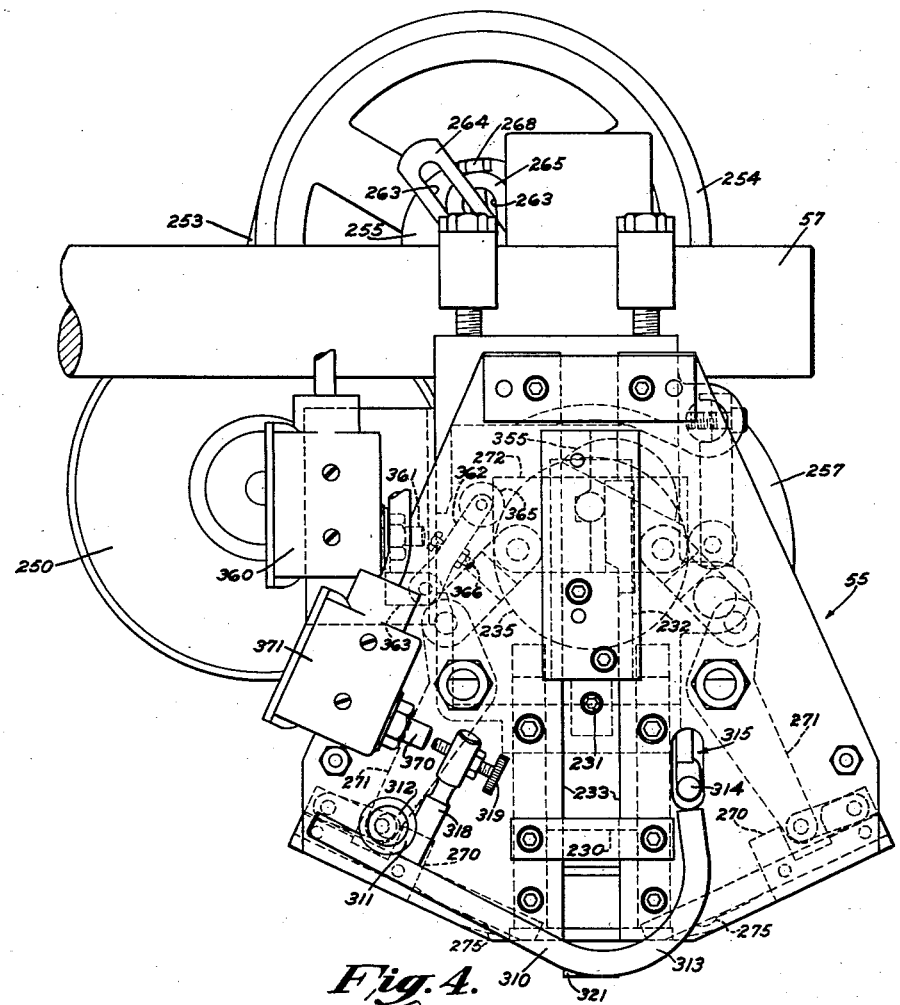
Fig. 4 is a front view of the stitcher-head or stapling unit showing the actuator or trip-lever for starting the operation of the staple-applying means.
Figure 5:
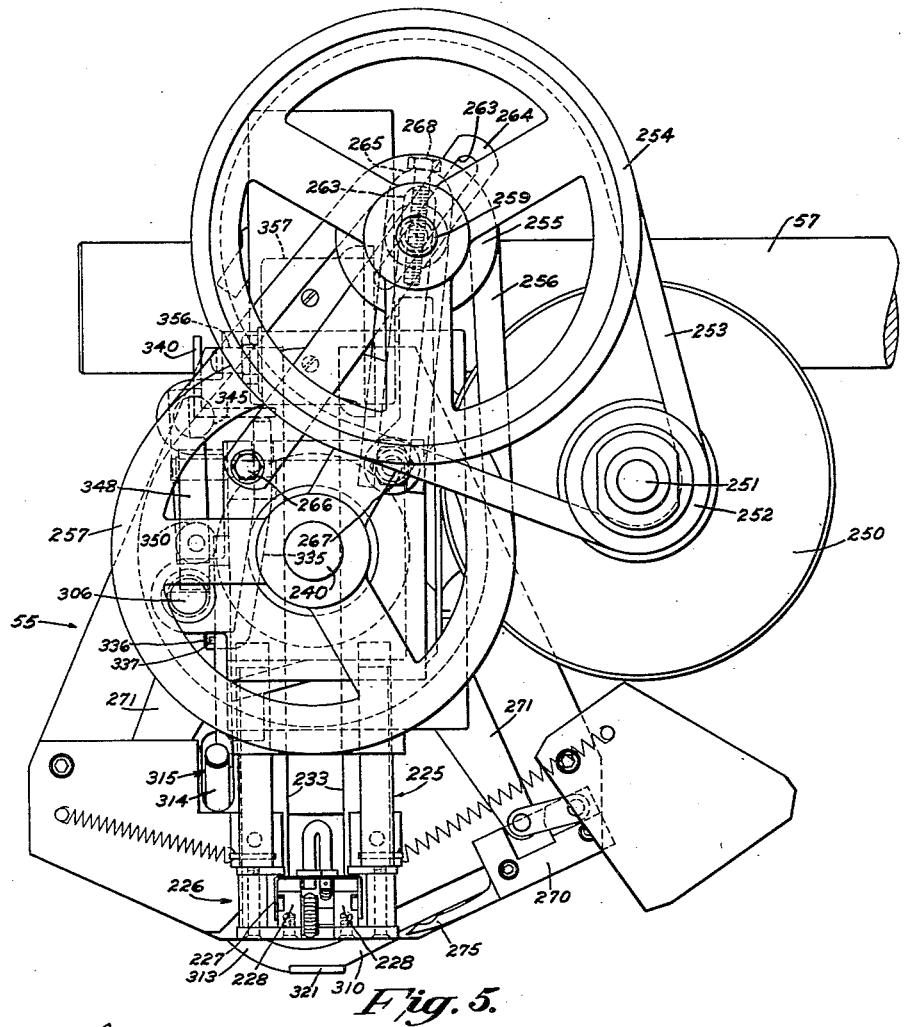
Fig. 5 is a rearward view of the same showing a portion of the clinching means for the driven staples and also the driving connections for the head.
Figures 6, 7:
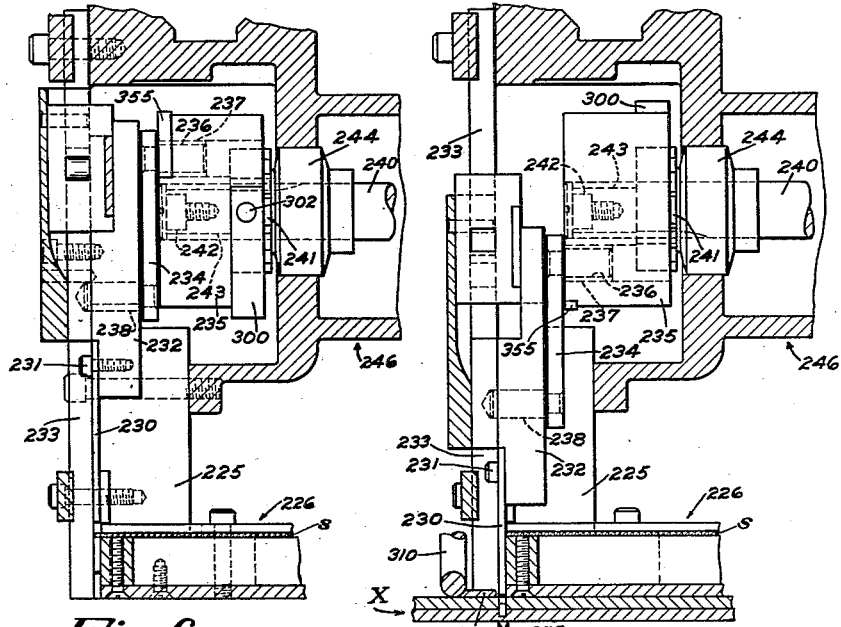
Fig. 6 is a vertical sectional view through the front portion of the stitcher-head showing the staple-driver in inoperative raised position.
Fig. 7 is a similar sectional view showing the staple-driver at the end of its downward stroke for driving a staple through the overlapped flaps of a container.
Figure 8:
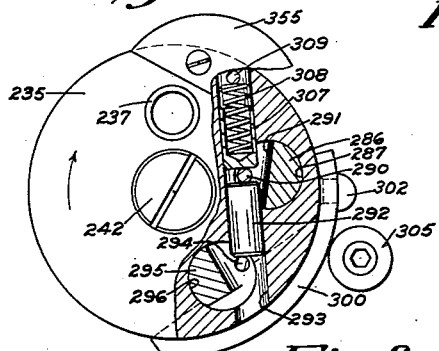
Fig. 8 is a part-sectional view of the rotary cam for intermittently operating the stitcher-head showing it with the roller for holding the cam declutched from the drive-shaft of the head.
Figure 10:
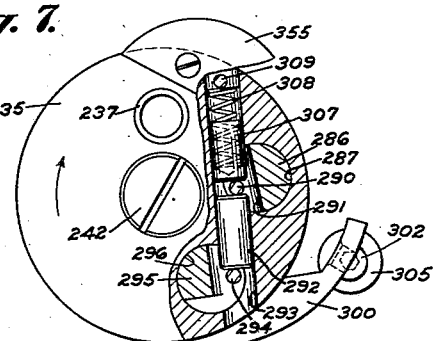
Fig. 10 is a view similar to Fig. 8 showing the clutch-actuating means in operative relationship.
Figure 9:
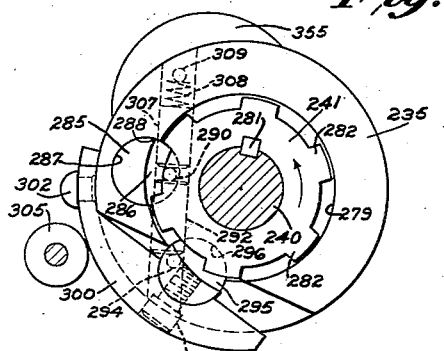
Fig. 9 is a view of the cam and clutch-means looking in the opposite direction from that of Fig. 8.
Figure 11:
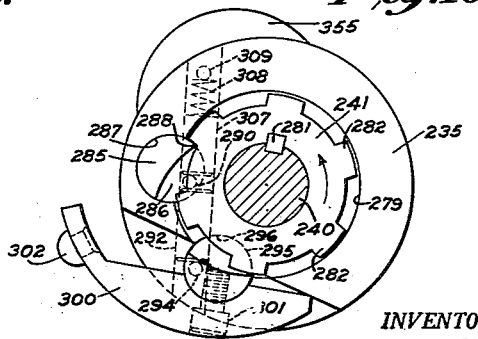
Fig. 11 is a view of the same looking in the opposite direction from that of Fig. 10 and showing the clutch-means engaged for driving the stapling mechanism.

Referring particularly to Figs. 3, 4 and 5, the two stitcher-heads 25 and 55 are substantial duplicates and generally of the same construction and arrangement as that shown and described in my prior patent application, Serial No. 409,386 filed February 10, 1954, now Patent No. 2,722,002, dated November 1, 1955. Each head consists in a framework 225 mounted in perpendicular relation to a horizontal staple-magazine 226 adapted to contain a large supply of U-shaped staples s (Fig. 3). A spring-operated pusher 227 of usual construction is slidable on a central core 228 that supports the staples in straddled relationship therealong to feed them to a reciprocable driver 230 which drives their legs through the carton flaps or other closure parts of a container or carton X indicated by dash-lines in Fig. 2. Suitable means are provided for reciprocating the staple-driver 230, and whereas in my prior application manually operative means are shown for this purpose, in the present machine the stapling mechanisms are operated by power means. The staple-driver 230 is attached at 231 to a reciprocating plunger 232 (Figs. 6 and 14) that is slidably mounted on suitable ways 233 on the framework of the head, the upper head 55 only being described herein since both heads are of substantially the same construction as previously indicated. The plunger 232 is reciprocated by a link 234 connected to a rotary member 235 which is constructed in the form of a cam (Figs. 8-11) and also constituted as a crank-element. A crank-pin 236 projecting from the upper end of the link 234 engages in an eccentrically-located bushing 237 in the cam-member 235 with the lower end of the link pivotally connected to the end of a stud 238 held in the plunger 232. The cam 235 is mounted normally free to rotate on a drive-shaft 240 and connected to be driven therefrom by means of a clutch-annulus 241 (Figs. 9 and 11).

The cam 235 and clutch-annulus 241 are held on the end of the shaft 240 by a headed screw 242, the shank of the screw being received in a counterbore in the shaft with a flange on the head overlying the end of a bushing 243 fast in the bore of the cam. The opposite end of the bushing 243 abuts the side of the clutch-annulus 241 to hold it from displacement relatively to a bearing 244 which abuts its opposite side. The shaft 240 constitutes the main drive for the machine, its forward end being journaled in the bearing 244 fixedly mounted in the frame 225 of the stitcher-head 55 with the rearward end of the shaft journaled in a bearing 245 in the overhanging rearward extension 246 (Fig. 3) of the frame. The shaft 240 is driven by a continuously running electric motor 250 (Fig. 5) by means of pulleys and belts as next described. The shaft 251 of the motor 250 carries a pulley 252 connected by a V-belt 253 to a larger pulley 254 which, in turn, has fast therewith a smaller pulley 255 connected by a belt 256 to a pulley 257 keyed at 258 to the rearward end of the drive-shaft 240 (Fig. 3).

The pulleys 254 and 255 are free to rotate on a stationary shaft 259 (Fig. 3), being held axially thereof at one end by a collar 260 secured to said shaft at 261 and at the other end by a washer 262 abutting the side of a pair of supporting members 264 and 265. The end of the shaft 259 is reduced in diameter to engage through slots 263 (Fig. 5) in the crossing supporting members 264 and 265 that are fastened to the overhanging framework 246 of the machine by bolts 266 and 267. A bolt 268 extending down through the top of the member 265 and threaded through a hole in the shaft 259 serves as means for adjusting the shaft longitudinally of the slots of the members 264 and 265 for tightening the belts 253, 256 on the several pulleys mentioned above. The slotted members 264 and 265 are permitted to rock about the bolts 266 and 267 during adjustment of the shaft 259 by loosening said bolts before the shaft is slid lengthwise of the slots in said members. A nut 269 on the reduced threaded end of the shaft 259 is employed for clamping it in adjusted relationship.

Referring particularly to Figs. 4 and 5, clinching means are provided for bending over the legs of the staples as they are driven through the flaps of a carton, the clincher-devices heein shown being of the same construction and arrangement as illustrated and described in my prior pending application, identified above, comprising slidable anvil-blades 270 (Fig. 5) reciprocable in inclined guideways on the frame of the head 55. The blades 270 are connected to levers 271 adapted to be oscillated by a reciprocable crosshead 272 shown by dotted lines in Fig. 4; this mechanism not being further described in detail herein as it substantially duplicates that disclosed in my prior pending application. Suffice it to explain herein that the anvil-blades 270 are provided with needle-like extensions 275 which pierce through the material of the carton flaps to position their recessed ends for engagement with the projecting legs of a staple to clinch them on the under side of the flaps, this action taking place as the crosshead 272 is clutched to the reciprocating plunger 232 as the driver 230 carried thereby approaches the end of its stroke in driving the staple through the carton flaps.

The clutch-means for connecting the rotary cam 235 with the shaft 240 to actuate the staple-applying and clinching means for a single operative cycle by one complete rotation of said shaft is constructed and arranged as next described. Referring to Figs. 9 and 11, the cam 235 is counterbored axially at 279 to receive the toothed clutch-annulus 241, previously mentioned, keyed fast to the shaft 240 at 281. The periphery of the clutch-annulus 241 is provided with a plurality of radially-projecting teeth 282 adapted to be engaged by a pawl 285 on the end of a cylindrical element 286 mounted to rotate in a transverse bore 287 in the cam 235. The pawl 285 is formed on the end of the element 286 by cutting away a portion thereof at one side of its axis to provide a relatively sharp point 288 for engagement with a tooth 282 on the annulus 241 as shown in Fig. 11. Normally, the pawl 285 is resiliently held in disengaged relationship (Fig. 9) with its point 288 free from the teeth on the clutch-annulus 241. A pin 290 projecting across a slot 291 in the side of the rotary pawl-element 286 (Fig. 10) is engaged by the end of a plunger 292 slidable in a bore 293 in the cam 235. The opposite end of the plunger 292 is engaged by a pin 294 (Fig. 10) projecting across a slot in a secondary rotary element 295 similar to the rotary pawl-element 286, first described, and mounted to turn in a transverse bore 296 in the cam 235. The side of the rotary element 295 is set into a semicircular recess in the side of a lever 300 and secured fast thereto by a screw 301, thus providing a pivotal mounting for said lever.

Figures 13, 14:
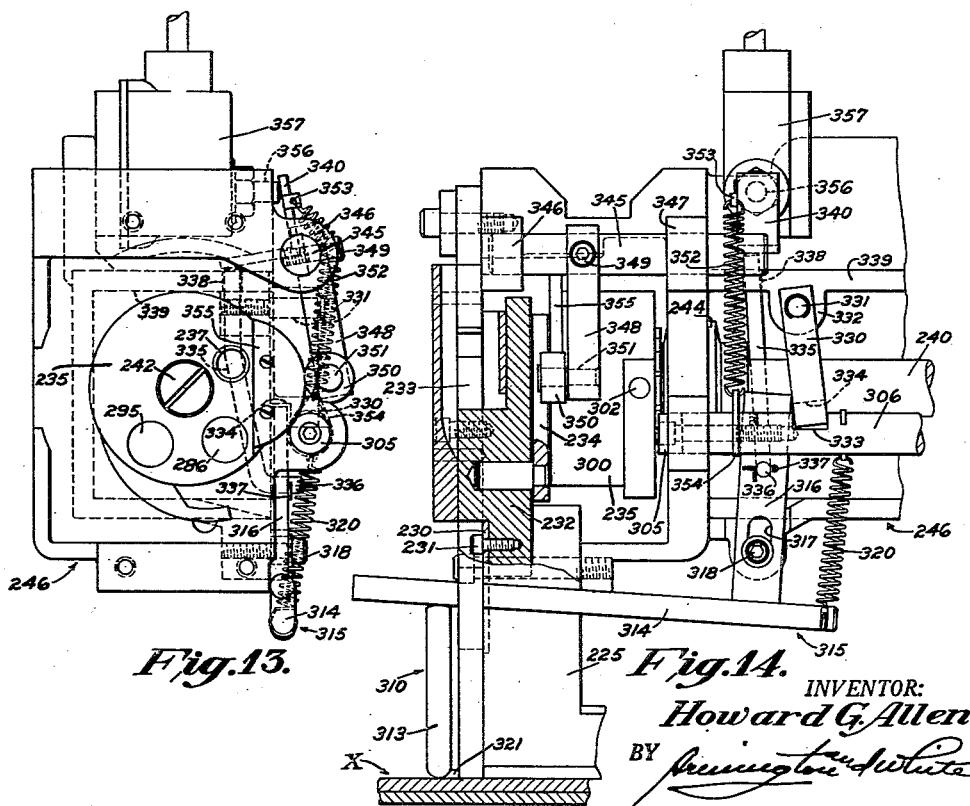
Fig. 13 is a similar view showing the cam turned to position for actuating the switch in the circuit for controlling the drive to the lower stitcher-head.
Fig. 14 is a side elevational view part-sectional through the front of the upper stitcher-head showing the actuator or trip-lever as moved by contact with the top of a carton for connecting the clutch with the cam to initiate the operation of said head.

The lever 300 has its outer face formed to a cylindrical contour concentric with the periphery of the cam 235 (Fig. 8) when said lever is in normal position for restraining the pawl 285 from engagement with the teeth 282 on the clutch-annulus 241. This last-described inoperative relationship of the lever 300 takes place as the cam 235 is rotated to engage the arcuate face of the lever with a roller 305 carried at the end of a slidable control-rod 306 (Figs. 3, 13 and 14). As the lever 300 is carried into inoperative relationship during its angular movement throughout a portion of the rotation of the cam 235 the pin 294 on the rotary element 295 will slide the plunger 292 into the position shown in Figs. 8 and 9 to cause its opposite end to move the pin 290 and rotate the element 286 for disengaging the pawl 285 from a tooth on the clutch-annulus 241. Opposing the action of the sliding plunger 292 is a similar plunger 307 which slides in the same bore 293, this latter plunger 307 being axially bored to receive a helical spring 308 with its end engaging a pin 309 extending across the bore 293 in the cam 235. The spring 308 acts to slide the plunger 307 to rotate the member 286 into the position illustrated in Fig. 11 for engaging the pointed end 288 of the pawl 285 with a tooth 282 on the clutch-annulus 241; this action taking place when the member 295 is rotated by the lever 300 to shift its pin 294 for releasing the plunger 292 so that the plunger 307 can slide under the force of the spring 308. A button 302 riveted to the end of the lever 300 serves as a stop for preventing the cam 235 from turning ahead after it has been declutched from the shaft 240, the button being adapted to engage the roller 305 (Fig. 9) should the cam tend to creep around the clutch-annulus 241.

Figure 15:
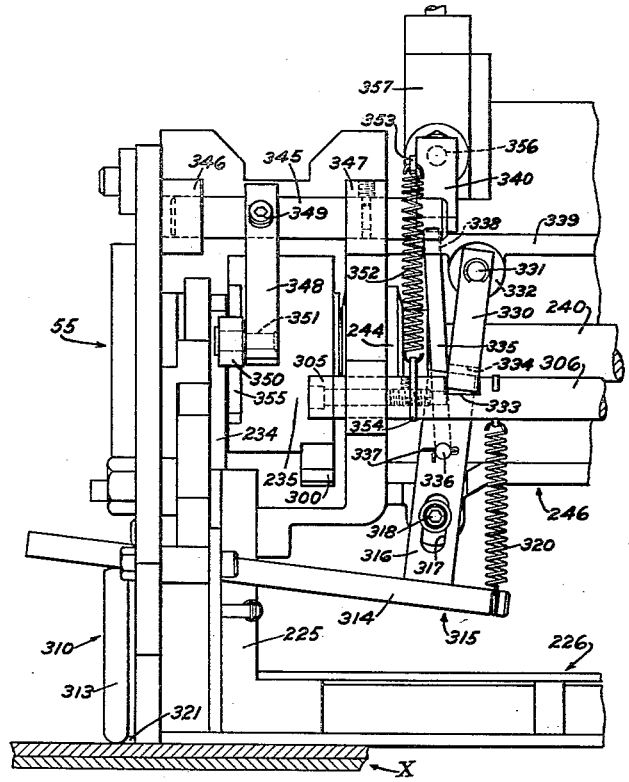
Fig. 15 is a similar view showing the clutch-operating means for the upper head returned to position for declutching the cam.

The roll 305 is released from the lever 300 to cause the cam 235 to be clutched to the shaft 240 by sliding the rod 306 toward the right as viewed in Figs. 14 and 15 through the actuation of means next described. It has been stated that the operation of the staple-applying means of both stitcher-heads 25 and 55 is initiated by a feeler or contact-means carried by the upper head 55 and engageable with the top of a carton as said head is lowered into operative relation thereto. Referring to Figs. 3 and 4, the upper head 55 carries a feeler or trip-lever 310 having its hub 311 pivotally mounted at the front of the machine on a stud 312. The trip-lever 310 extends downwardly from its pivot in a straight length with an extension 313 curved upwardly therefrom to terminate a slight distance below a rod 314 (Figs. 3 and 15) forming one arm of a right-angular lever 315. The lever 315 has a relatively flat vertical arm 316 formed with a slot 317 through which projects a stud 318 for pivotally and slidably mounting the lever on the overhanging framework 246 of the machine. Through this means the lever 315 is rockably mounted while also being adapted to slide up and down to a limited extent on its pivot-stud 318. A helical spring 320 suspended from the slidable control-rod 306, previously described, has its lower end hooked around the rearward end of the rod 314 to normally hold the lever 315 in raised relationship as shown in Fig. 3.

The trip-lever 310 is preferably formed with a flat foot or contact portion 321 adapted to engage the top of a carton to cause said lever to be swung upwardly to rock the lever 315 from the position shown in Fig. 3 to that illustrated in Fig. 15. Referring to Fig. 3, the slidable control-rod 306 has a helical spring 322 encircling it with one end engaging against a bearing 323 on the framework 246 in which the rod slides and its opposite end held by a cotter pin 324 whereby the spring normally tends to slide said rod to the left to engage its roller 305 with the clutch-actuating lever 300. A washer 325 fastened to the end of the rod 306 by a bolt 326 engages the end of the bearing 323 to limit the sliding movement of the rod 306 under the force of the spring 322. The control rod 306 is shifted to the right as viewed in Fig. 3 to release the roll 305 from the clutch-actuating lever 300 by means of a lever 330 pivotally mounted on a pin 331 held in a boss 332 on the framework 246 with its lower end engaging in a slot 333 cut through the upper part of said rod. The lever 330 is rocked counterclockwise to slide the rod 306 to the right through the engagement therewith of the arm 316 of the lever 315, see Fig. 14; it being here noted that the lower end of the lever 330 is cut away on its rearward side at 334 to adapt the end of the arm 316 to slide past when the lever 315 is carried downwardly through means later described.

Figure 12:
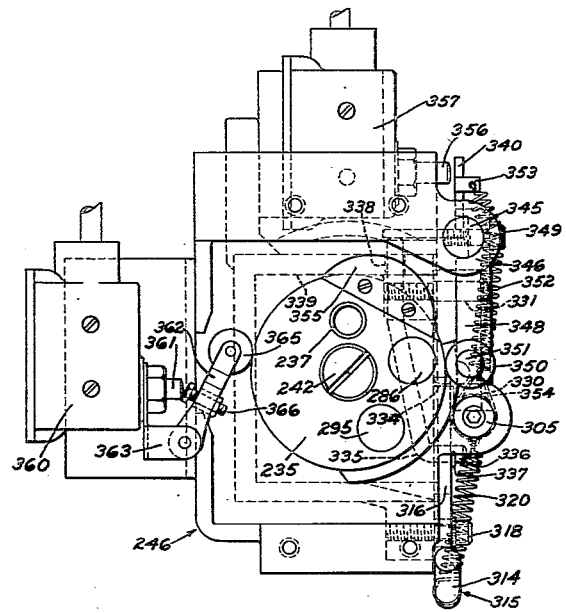
Fig. 12 is an elevational view in reduced scale showing the cam and illustrating its cooperative relationship to certain electrical switches in the circuits for controlling the operation of the stitcher-heads.

A vertically-extending rod 335 (Figs. 3, 12 and 13) having an angular portion 336 at its lower end hooked through a hole in the arm 316 of the lever 315 and held by a cotter pin 337 is mounted with its upper end slidable through an enlarged hole 338 in a rib 339 of the framework 246. The upper extremity of the rod 335 is engaged by an angle-iron member 340 welded or otherwise suitably secured to a rod 345 rockably mounted in bearings 346 and 347 on the framework 246. Referring to Figs. 12, 13 and 14, the rockable rod 345 carries a lever 348 fastened thereto by a screw 349, the lower end of said lever mounting a roller 350 journaled on a stud 351 (Fig. 14). A helical spring 352 fastened to an ear 353 on the angle-iron member 340 reaches downwardly therefrom with its lower end hooked through a wire loop 354 on the control rod 306, the tension of said spring tending to rock the rod 345 to maintain the lever 348 with its roller 350 bearing against the periphery of the cam 235, as shown in Fig. 12. Formed on or fastened to the cam 235 is a lobe 355 projecting from its rim in arcuate peripheral contour to adapt it for engagement with the roller 350 to force it outwardly and rock the lever 348 counterclockwise as indicated in Fig. 13. This latter motion of the lever 348 acts to rock the rod 345 to swing the upper end of the angle-member 340 against a slidable push-button 356 projecting from a switch 357 (Figs. 12 and 13) for closing the circuit to the electrical means for controlling the operation of the lower stitcher-head as later described. Referring to Fig. 12, a switch 360 is provided with a push-button 361 projecting therefrom for engagement by a lever 362 pivoted to a bearing 363 and carrying a roller 365 journaled at its upper end for engagement by the lobe 355 on the cam 235. A set-screw 366 screwed through a boss on the lever 362 provides means for adjusting its head to regulate its contact with the push-button 361. It should be explained that the actuator or trip-lever 310 is provided with an angular arm 318 carrying an adjustable screw 319 adapted to engage and depress a push-button 370 for a switch 371 which controls the downward movement of the upper stitcher-head 55 in the manner as later explained.

Figures 16, 17:
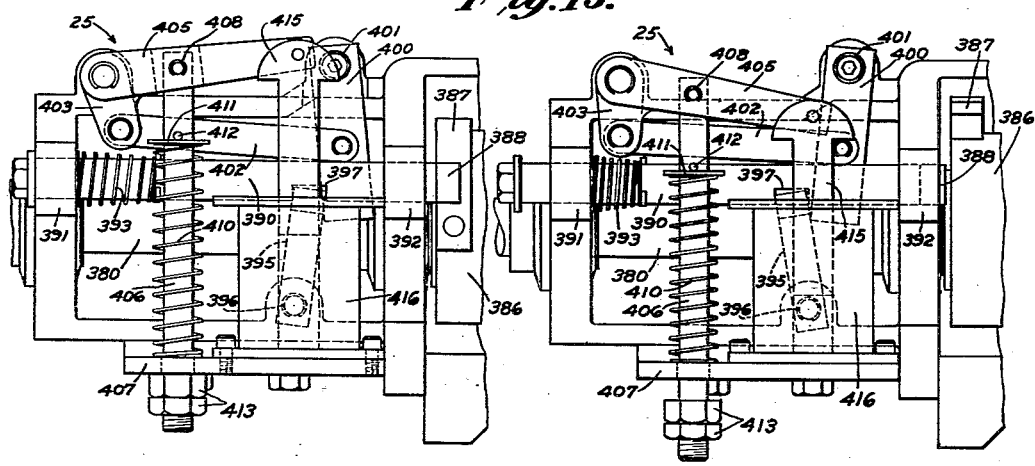
Fig. 16 is a detailed elevational view of the mechanism for controlling the clutch-means of the lower stitcher-head including a solenoid.
Fig. 17 is a similar view showing the parts in reverse position for connecting the clutch with the cam.

The operation of the lower head 25 is controlled by substantially the same mechanism as that employed for the upper head 55. Referring to Figs. 16 and 17, the lower head 25 is driven by a drive-shaft 380 connected by pulleys and belts, indicated generally at 381 in Fig. 2, to a continuously running motor 385. A cam 386 of the same construction and arrangement as that employed in the upper head 55 is clutched to the shaft 380 by the release of a control-lever 387 which is normally held inoperative by a roller 388 carried at the end of a slidable rod 390 (Fig. 16). The rod 390 is slidably mounted in bearings 391 and 392 and normally urged toward the right to engage the roller 388 with the control-lever 387 by a spring 393 coiled around the rod. A shift-lever 395 pivoted at 396 has its end engaged in a slot 397 in the rod 390 for sliding the rod to release the roller 388 from the lever 387. The shift-lever 395 is operated for sliding the rod 390 by a lever 400 pivoted at 401 and connected by a link 402 to the shorter arm 403 of a bell-crank lever 405. A vertical rod 406 slidable through a lower bearing 407 is pivotally connected at 408 to the bell-crank lever 405. A helical spring 410 surrounding the rod 406 and compressed between the bearing 407 and a washer 411 pinned to the rod at 412 tends to rock the bell-crank lever 405 counterclockwise with its motion limited by means of nuts 413 on the lower threaded end of the rod 406 engaging the bearing 407. The bell-crank lever 405 is rocked clockwise for drawing the lever 400 toward the left as indicated in Fig. 17 by means of an armature-plunger 415 pivotally connected to the long arm of the bell-crank lever and slidable by attraction into a solenoid 416. Referring to Fig. 17, the solenoid 416 is energized by closing the switch 357, previously described, by action of the lever 348 (Fig. 13) that is rocked by engagement of its roller 350 with the lobe 355 on the cam 235 in the upper head 55. As the armature 415 is drawn downwardly into the solenoid 416 to swing the lever 400 toward the left, as viewed in Fig. 17, the lower end of said lever will rock the shift-lever 395 into the position shown by dotted lines in this latter view to slide the rod 390 in the same direction and remove the roller 388 from the clutch control-lever 387. In this manner the lever 387 is released to cause the cam 386 to be clutched to the drive-shaft 380 in the same manner as explained in connection with the operation of the clutch-means for the upper head 55. Consequently, the crosshead of the lower stitcher-head 25 will be reciprocated from the cam 386 for operating the staple-applying means to drive a staple through the flaps on the bottom of the carton with their legs clinched on the interior thereof in the same manner as described in connection with the upper stitcher-head 55.

Figure 24:
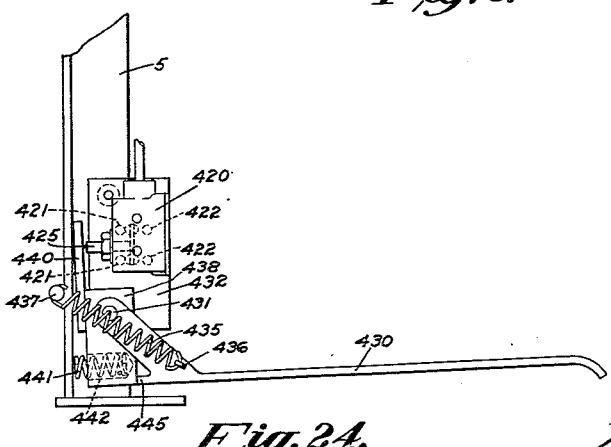
Fig. 24 is a view of the pedal-operated switch for closing the electrical circuit that operates the machine.

Electrical current is supplied to the machine from power-line conductors connected with different circuits for operating the motors and other electrical devices as indicated in the wiring diagrams, Figs. 25–29. For convenience of manual control a pedal-operated switch 420 (Fig. 24) may be employed for connecting the machine with the source of current. As shown in this latter view, the switch 420 is of a type having two sets of poles with their contacts 421—421 and 422—422 connected respectively in different circuits with the contacts for one circuit normally held closed. The switch 420 is operated by a plunger or push-button 425 to open one set of contacts 421—421 and close the opposite set 422—422 through means of a foot-lever or pedal 430 pivoted on a pin 431 fast in a plate 432 which is attached to one of the legs 5 of the table 2. The pedal 430 is normally held in operative position by a spring 435 having one end hooked thereto at 436 with its opposite end anchored to a pin or abutment 437 on the leg 5. Pivoted on the pin 431 at one side of the shorter arm of the lever 430 is a block-like member 438 that is formed with, or has attached thereto, an upwardly-projecting arm 440 adapted to be engaged with the end of the push-button 425 for actuating the switch 420. A helical spring 441 pocketed in a bore 442 in the member 438 tends to rock the latter to engage its arm 440 against one flange of the angle-iron leg 5 and maintain it disengaged from the switch-button 425. A projecting lug 445 at the end of the pedal 430 normally engages with the member 438 whereby when the pedal is depressed it will rock said member clockwise to carry its arm 440 against the push-button 425 and slide the latter to actuate the switch in the manner and for the purposes as later more particularly explained in connection with the wiring diagrams. As shown in Fig. 1, the pedal 430 may be swung upwardly alongside the leg 5 to render it inoperative and position it out of the way when the machine is at rest.

It has been stated that the declutching of the motor-drive from the shaft 69 to arrest the upward travel of the head 55 is effected by opening the limit switch 142. A second limit switch 375 may also be provided (Fig. 1) adapted to be operated by a push-button 376 which is movable by and with the lever 141 for operating the limit switch 142. An extension of the pin 134 that connects the rod 140 with the lever 141 is arranged to engage and depress the push-button 376. The auxiliary limit switch 375 is connected in circuit with a push-button switch 377 (Fig. 1) mounted on the framework 71 at the top of the column 10. The purpose of the push-button switch 377 is to provide for manual control of the upward travel or lift of the carriage 62 and stitcher-head 55, the auxiliary limit switch 375 being connected to the solenoid 125 (Figs. 20 and 28) for clutching the drive to the shaft 69 carrying the sprocket 66 for traveling the chain 65. The method of operation of this part of the machine control is more particularly pointed out hereinafter in the explanation of the various electrical circuits shown by the diagrams Figs. 26–29.

Figure 26:
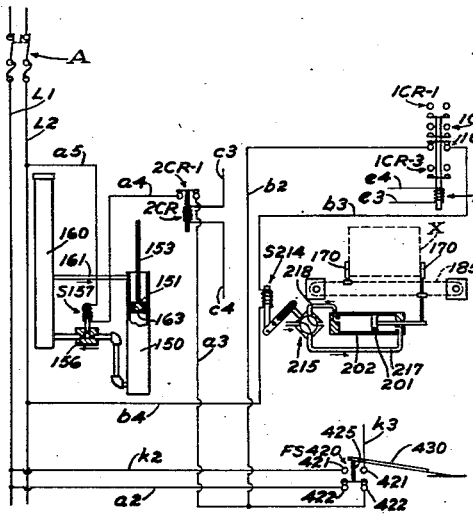
Figs. 26 to 29 are schematic-diagrammatic views of the electrically-operated units and their branch circuits.
Figure 27:
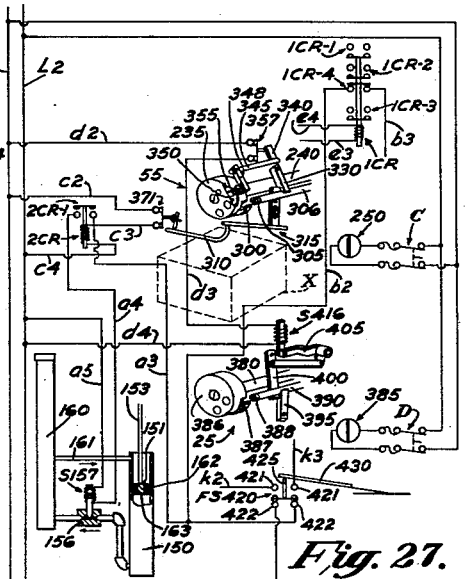

Certain of the electrical devices, the timer and other relays are contained in a casing 450 (Fig. 1) supported by the column 10. These elements of the circuits are not illustrated graphically as to their arrangement in said casing, but are shown diagrammatically in Figs. 26–29. Fig. 25 is a substantially complete diagram of the wiring for connecting the several electrical devices with their circuits, but to avoid complicating the drawing, only the motors, solenoids and switches are designated by reference numerals; the relays being identified by code letters such as TR for timer-relay and CR for contact-relays. Figs. 26–29, on the other hand, illustrate the different circuits in connection with the switches for energizing the solenoids that operate the mechanical elements of the machine control, these latter elements being shown schematically. For example, Fig. 26 shows the circuit to the solenoid-operated valve 156 for the hydraulic means that controls the lowering of the upper stitcher-head; and also the circuit to the solenoid-operated valve 215 for the pneumatically-actuated piston that adjusts the pressure-bars 170 against the sides of a carton to locate and hold it in position to be operated upon.

As Figs. 26–29 schematically represent the mechanical elements of the machine, the complete method of operation thereof is explained in connection with these views with letters of the alphabet designating the conductors.

Power is applied to the machine from any suitable source connected by a main switch A (Fig. 26) to line conductors L1 and L2. The several motors 75, 250 and 385 which operate respectively the upper stitcher-head lift, the upper stitcher-head 55 and the lower stitcher-head 25 are indicated in the diagram of Fig. 25 as having their circuits connected to the power lines L1 and L2 by means of manually-operated switches B, C and D. To start the operation of the machine the swtiches B, C and D are closed to energize the circuits for driving the motors 75, 250 and 385 continuously.

A carton X, indicated by dotted lines in Fig. 1, is placed on the table 2 and the machine started to operate by depressing the pedal 430 to close contacts 422 in the switch FS420. At this juncture the solenoid S125 (Fig. 28) is de-energized and the drive from the motor 75 to shaft 69 declutched so that the sprocket 66 is free to turn to lower the head 55. When the contacts 422 are closed, however, as indicated in Fig. 26, a circuit is formed for energizing the solenoid S157 to open the valve 156; said circuit comprising line L1, conductor a2, contacts 422 in FS420, conductor a3, contact relay 2CR–1, conductor a4, solenoid S157, conductor a5 and line L2. With the valve 156 open the fluid flows therethrough to allow the piston 151 to descend in the cylinder 150 as the head 55 moves downwardly under the force of gravity. As the piston 151 descends in the cylinder 150 the flapper-valve 163 is closed against its under side so that the fluid is forced through the valve 156 and by-passed from reservoir 160 into the upper end of the cylinder through pipe 161. The descent of the stitcher-head 55 is thus retarded to prevent it from striking forcibly against the top of the carton X and, as this contact is made the valve 156 is closed (Fig. 27), so that the fluid will act on the piston 151 to resiliently support the head 55 during its engagement with the carton.

During the lowering of the stitcher-head 55 the pressure-bars 170 are moved toward each other to contact opposite sides of the carton X under the pneumatic pressure on the piston 201 in the cylinder 202, as previously explained. The adjustment of the pressure-bars 170 is controlled by the four-way valve 215 actuated by the solenoid S214. The solenoid S214 is energized by a circuit comprising line L1, conductor a2, contacts 422 in footswitch FS420, conductors a3, b2, 1CR–4 in relay 1CR, b3, S214, b4 and line L2. With the valve 215 adjusted as indicated in Fig. 26, air is supplied to one end of the cylinder 202 to slide the piston 201 to the left for drawing the pressure-bars toward each other into contact with the sides of the container X and holding it in position to be operated upon.

During the descent of the stitcher-head 55 the trip-lever 310 thereon contacts the carton X and is pivoted upwardly to close switch 371 (Fig. 27) in the circuit to the relay 2CR; said circuit comprising line L1, conductors c2, switch 371, c3, relay 2CR, conductor c4, and line L2. As the relay 2CR is energized the contacts 2CR–1 are opened to thereby de-energize the solenoid S157 for closing the valve 156; this latter circuit comprising the conductors previously mentioned in connection with the description of the circuit shown in Fig. 26. With the valve 156 closed the piston 151 reaches the end of its descent to resiliently support the upper stitcher-head 55 in position for applying staples to the top of the carton X.

As a further result, the upward pivoting of the trip-lever 310 rocks the lever 315 (Fig. 27) to slide the rod 306 and thereby withdraw the roller 305 from the clutch-actuating lever 300. The lever 300 is thus released to clutch the cam 235 to the continuously-driven drive-shaft 240 for rotating it to actuate the staple-applying means of the head 55 in the manner previously explained in connection with Figs. 8–11. Rotation of the cam 235 acts first to close switch 357 and energize the circuit to solenoid S416 for starting the operation of the lower stitcher-head 25. It has been explained previously that solenoid S416 functions to rock lever 405 to slide rod 390 and withdraw roller 388 from lever 387 to cause it to clutch cam 386 to drive-shaft 380, this action starting the operation of the lower head 25. The circuit including switch 357 and solenoid S416 comprises the following conductors shown in Fig. 27; i. e., L1, d2, switch 357, d3, S416, d4 and L2.

After each stitcher-head 25 and 55 has operated through a complete cycle to apply single staples to the flaps on the top and bottom of the carton X the cams 235 and 386 are declutched from their drive-shafts and the upper head 55 is lifted to a slight extent to free the carton X so that it may be fed forward. At this juncture the pressure-bars 170 are also withdrawn from the sides of the carton by reversing the direction of the air-pressure in the cylinder 202 to cause the piston 201 to be slid to the right as viewed in Fig. 28. This action is effected by de-energizing the solenoid S214 to adjust the valve 215 for feeding the pressure in the direction indicated by the arrows in Fig. 28. As the cam 235 nears the end of one complete revolution its lobe 355 engages the roller 365 to rock the lever 362 (Fig. 28) and close switch 360. The closing of switch 360 acts through a circuit including relay 1CR to close its contacts 1CR–1, 1CR–2 and 1CR–3, thereby opening contacts 1CR–4 to de-energize solenoid S214. This last-mentioned circuit comprises line L1, conductor e2, switch 360, e3, relay 1CR, e4 and line L2. The switch 360 is closed for only an instant as the cam 235 continues its rotation and the lobe 355 turns past the roller 365. Therefore, another circuit must be employed to maintain the relay 1CR energized; this latter circuit comprising the following conductors, L1, f2, contacts TR–1, f3 to limit-switch LS142, f4, 1CR–1, f5, e3, relay 1CR, e4 and line L2. Thus relay 1CR continues to be energized to maintain contacts 1CR–1, 1CR–2 and 1CR–3 closed and contacts 1CR–4 open.

Contacts 1CR–2 are in a circuit for energizing solenoid S125 to control the clutch 72 for connecting the motor 75 to drive shaft 69. This circuit comprises line L1, conductor g2, 1CR–2, g3, h3, limit switch LS375, h4, solenoid S125, h5 and L2. Contacts 1CR–3 are in a circuit for energizing a timer-relay TR which controls the extent of lift of the head 55 and thereby the time interval between repeated operations for applying single staples to the top and bottom of the carton. This circuit comprises conductors L1, j2, contacts 1CR–3, j3, timer-relay TR, j4 and L2. These last described circuits are used to energize the relay 1CR and close its contacts, the solenoid S125 for actuating the clutch 72 and the timer-relay TR which delays the opening of all these several circuits.

It should be explained that the extent of lift of the upper stitcher-head 55 and therefore the time interval before it starts to return to the carton is controlled by the timer-relay TR. At this time the contacts 1CR–1 are closed to maintain relay 1CR energized and hold contacts 1CR–2 closed with the solenoid S125 energized for clutching the drive from motor 75 to shaft 69 carrying the sprocket 66 for traveling chain 65; the contacts 1CR–3 also being closed to maintain the timer-relay TR energized. It will thus be understood that the timer-relay TR functions eventually to de-energize the solenoid 125 to de-clutch the drive from the shaft 69 and allow the head 55 to descend. The action of the timer-relay is so timed as to break the circuit to the relay 1CR for arresting the upward travel of the head 55 after the head has been lifted only a short distance above the carton.

The lifting of the upper head 55 releases the trip-lever 310 which drops by gravity to open switch 371. This breaks the circuit to de-energize the relay 2CR and thus causes contact 2CR–1 to be closed, thereby energizing solenoid S157 to open valve 156 in preparation for the next descent of the piston 151. Then as the piston 151 descends in cylinder 150 with the lowering of the head 55 the flapper-valve 163 closes the openings 162 in the piston for causing the fluid in cylinder 150 to control the descent of the head in the manner previously explained. This occurs only when the pedal 430 is depressed to close contacts 422 in FS420 and as long as the switch remains in this condition the head 55 will be alternately raised and lowered for continuous operation of the machine.

When it is desired to stop the operation of the machine the operator's foot is raised to released the pedal 430 (Fig. 29) which is resiliently moved upward to open contacts 422 and close contacts 421. The closing of contacts 421 energizes relay 1CR to close contacts 1CR–1, 1CR–2 and 1CR–3 and open contacts 1CR–4. The circuit to relay 1CR includes the following conductors L1, k2, contacts 421 in FS420, k3, f3, thereby by-passing the timer-relay contacts TR–1, and continuing beyond the end of conductor k3 through limit-switch LS142, conductor f4, contacts 1CR–1, f5, e3, relay 1CR, e4 and L2. The energizing of relay 1CR closes contacts 1CR–1 to maintain relay 1CR energized. The closing of contacts 1CR–2 closes the circuit previously described for energizing solenoid S125 for clutching motor 75 to drive the shaft 69 and thereby travel chain 65 for lifting the head 55 above the table 2. The head 55 continues to move upwardly until its plate 144 compresses and loads spring 147 to cause it to slide the rod 140 upwardly for opening the limit switch LS142. Opening of switch LS142 de-energizes relay 1CR, thereby opening the circuit through contacts 1CR–2 to solenoid S125 for declutching motor 75 from shaft 69; it being understood that the timer-relay TR is ineffective at this juncture due to the fact that the circuit to the timer-relay contact TR–1 is by-passed.

Figure 28:
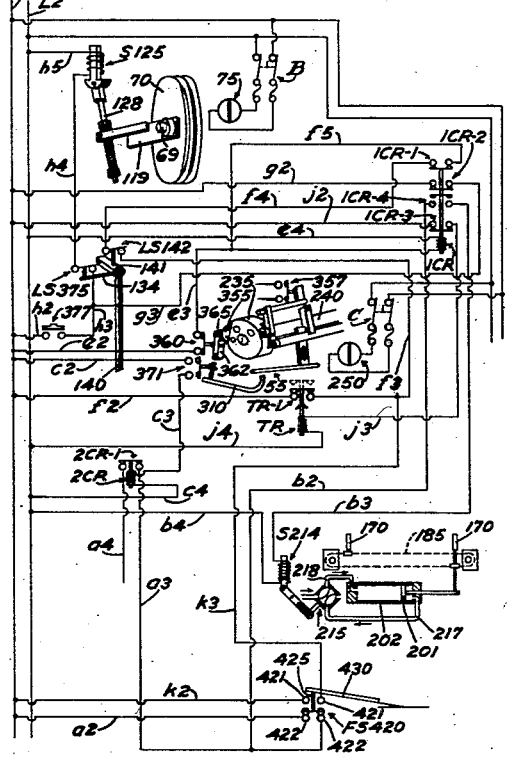
Figure 29:
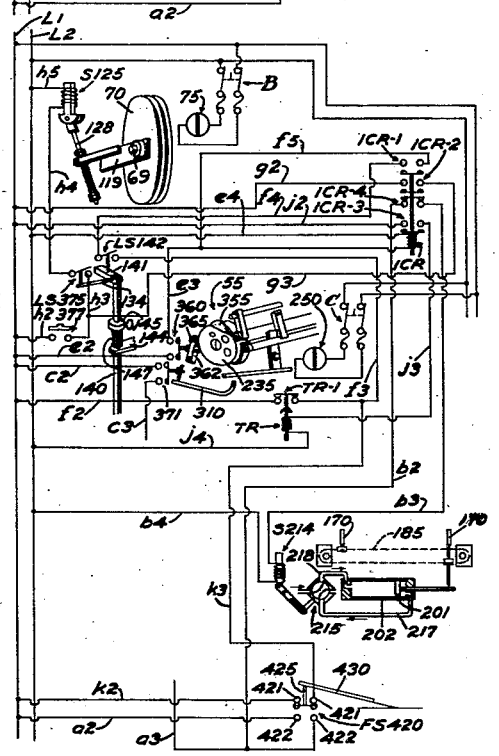

During this last explained raising of the upper head 55 the pressure-bars 170 are withdrawn by de-energizing the solenoid S214 for reversing the valve 215, the circuit through 1CR–4 to solenoid S214 having been opened as shown in Fig. 28 by energizing the contact-relay 1CR. In the meantime, the contacts 421 having been closed by release of the pedal 430 of switch FS420 the contacts 422 will be opened and consequently, the circuit to relay contacts 2CR–1 will be open. Immediately the head 55 rises above the carton X the switch 371 will be opened to de-energize relay 2CR, causing relay contacts 2CR–1 to close, the effect of this being nil inasmuch as contacts 422 in switch FS420 are open. The machine remains in this condition with the several electrically-controlled devices at rest but prepared for another cycle of operations to staple the top and bottom closure flaps of a carton in the same manner as explained above.

Referring now to Figs. 3, 16 and 17, it is here noted that as the cam 235 starts to rotate the rod 306 is slid by the spring 322 to re-engage the roller 305 with the clutch-operating lever 300 as the cam completes one revolution; and likewise during rotation of the cam 386 in the lower stitcher-head 25 the rod 390 is slid by its spring 393 (Fig. 16) to re-engage the roller 388 with the clutch-actuating lever 387. Thus the return of the clutch-operating levers to first position prepares the staple-applying mechanisms of the two heads for another cycle of operation.

To recapitulate, the sequence of operations of the complete machine is explained briefly as follows: With the upper head 55 supported in raised relationship, depression of the pedal 430 actuates foot-switch FS420 to energize solenoid 157 and open valve 156 for lowering the upper head. At the same time solenoid 214 is energized to cause pressure-bars 170 to close together into contact with the sides of a carton X on table 2. As head 55 approaches the end of its descent, trip-lever 310 contacts the top of carton X and closes switch 371 to energize relay 2CR for de-energizing solenoid 157. The valve 156 is thereby closed to halt the descent of stitcher-head 55. Thereupon, the pivoting of trip-lever 310 actuates lever 315 to shift rod 306 and withdraw roller 305 from clutch-lever 300 for clutching cam 235 to drive-shaft 240. As cam 235 rotates its lobe 355 operates lever 348 to close switch 357 and energize solenoid 416. Solenoid 416 operates lever 405 in lower head 25 to withdraw roller 388 from lever 387 for clutching cam 386 to drive-shaft 380. Both stitcher-heads are thus started to operate to apply single stapes to the top and bottom flaps of the carton. As cam 235 in upper head 55 continues to rotate lobe 355 closes switch 360 to energize relay 1CR for closing contacts 1CR–1, 1CR–2, 1CR–3 while opening contacts 1CR–4. Relay 1CR continues energized through contacts 1CR–1 with solenoid 125 energized through 1CR–2, timer-relay TR being energized through contacts 1CR–3 while solenoid 214 is de-energized by opening contacts 1CR–4. When contacts 1CR–4 are opened solenoid 214 is de-energized for reversing valve 215 to separate pressure-bars 170. Simultaneously, the upper head 55 starts to ascend as clutch 72 is engaged by energization of solenoid 125 for driving sprocket 66 to travel chain 65. As head 55 begins to ascend trip-lever 310 drops and opens switch 371 to de-energize relay 2CR and close contacts 2CR–1. The closing of contacts 2CR–1 while contacts 422 in switch FS420 remain closed energizes solenoid 157 to open valve 156, whereupon the upper head 55 is free to start its descent to commence another cycle of operation.

Manual control of the lifting means for the upper head 55 may be accomplished through operation of the push-button switch 377, previously referred to as mounted on the framework 71 at the top of the column 10. In case of emergency should the operation of the upper stitcher-head 55 be interfered with, for example, by jamming of a staple in its throat, the push-button switch 377 can be used to close a direct circuit for energizing the solenoid S125 to engage the clutch 72 for connecting the motor 75 to drive the shaft 69. The sprocket 66 at the end of the shaft 69 is thus caused to travel the chain 65 for raising the upper head 55 away from the carton on which it has been operating. The carriage 56 will continue to lift the head 55 until the contact plate 144 loads the spring 147 to slide the rod 140 upwardly and open the limit switch LS375, thereby opening the circuit to de-energize the solenoid S125 and cause the motor to be declutched from the shaft 69. The stitcher-head 55 will therefore come to rest in its uppermost relationship and will so remain with the stapling mechanism inoperative until the jammed stape is removed or other dislocation of the mechanism of the head corrected. The main purpose for the auxiliary switch LS375 is to provide against accidental operation of the head-lifting mechanism, for example should the operator fail to remove his finger from the push-button of the switch 377 so that the closing of the circuit to the solenoid S125 is continued, the clutch means would remain driven from the motor 75 through the clutch to the shaft 69 and cause the sprocket 66 to tend to continue the upward travel of the chain 65 so that the rod 140 would exert unwarranted force against the lever 141 without arresting the drive from the motor 75 to the shaft 69. That is to say, current would be supplied to the solenoid S125 through the direct circuit from the push-button switch 377. The circuit from the push-button switch 377 to the auxiliary limit switch LS375 and thence to the solenoid S125 comprises the following conductors shown in Fig. 28, i. e., line L1, conductor h2, switch 377, h3, switch LS375, h4, solenoid 125, h5 and L2.

It will be understood that during the manual control of the lifting of the upper head by use of the switch 377 the operator's foot must be removed from the pedal 430 so that the contacts 421 are closed. The circuit from the contacts 421 is explained in connection with the diagram of Fig. 29.

It is to be understood that the present invention is herein shown and described as embodied in a preferred form of construction. However, modifications may be made in the structure and arrangement of the various parts of the machine without departing from the scope of the invention as expressed in the appended claims and therefore, without limitation in this respect, I claim:

1. In a machine for sealing cartons and other containers, a table for supporting containers to feed therealong and formed with an opening therein, a stitcher-head mounted beneath the table and having staple-applying means adapted to operate through the opening therein, a second stitcher-head mounted to move vertically above said table, a motor for driving each stitcher-head, power-operated means for raising said second stitcher-head, means for releasing said raising means to cause gravity to lower said second stitcher-head into contact with a container on the table, and electrical means operated by contact of the container for connecting each stitcher-head for operation by its individual motor to apply staples to the top and bottom of the container for sealing it.

2. In a machine for sealing cartons and other containers, a table for supporting a container to feed therealong, said table formed with an opening therethrough, a stitcher-head mounted beneath the table and having stapling means for operation through the opening therein, a second stitcher-head mounted for vertical movement toward and away from said table, a motor for operating each stitcher-head, means for raising said second stitcher-head above said table, means for releasing said raising means to cause gravity to lower said stitcher-head into contact with a container on the table, means engageable with the container during the lowering of the second stitcher-head, and means operated by engagement of said last-named means with the container for connecting said motors to their respective stitcher-heads for operating them to apply staples to the top and bottom of the container.

3. In a machine for sealing cartons and other containers, a table for supporting a container to feed therealong, said table formed with an opening therethrough, a stitcher-head mounted beneath the table and having stapling means for operation through the opening therein, a second stitcher-head mounted for vertical movement toward and away from said table, a motor for driving each stitcher-head, power means for raising said second stitcher-head above said table, means for releasing said raising means to cause gravity to lower said second stitcher-head into contact with a container on the table, means engageable with the container during the lowering of the second stitcher-head, means operated by engagement of said last-named means with the container to connect both motors with their respective stitcher-heads for applying staples to the top and bottom of the container, and means for adjusting the extent of upward movement of said second stitcher-head in proportion to the height of the container being sealed.

4. In a machine for sealing cartons and like containers, a table for supporting containers to feed therealong, a stitcher-head, power means for operating said stitcher-head, means for raising said stitcher-head relatively to said table, electrical means actuated by contact with a container as the stitcher-head is lowered relatively thereto to connect said power means to operate the stitcher-head for applying staples to the container, and means operated automatically for raising the stitcher-head after the application of each staple to the container to permit said container to be fed forwardly to apply a plurality of staples in series therealong.

5. In a machine of the type indicated, a table for supporting containers to feed therealong, a stitcher-head supported above said table, pressure-members slidably mounted above said table to move toward each other, an endless chain connected to said pressure-members, and pneumatically-operated means for traveling said chain to move said pressure-members into contact with the sides of the container to locate it for operation thereon by the stitcher-head.

6. In a machine of the type indicated, a table for supporting containers to feed therealong, a stitcher-head supported above said table, a pair of pressure-members mounted to move toward each other for contact with the sides of a container to locate it with respect to said stitcher-head, an endless chain having its opposite reaches connected to the opposite pressure-members, a cylinder, a piston slidable in said cylinder, said piston connected to travel the chain in opposite directions, pneumatic means for sliding the piston, and automatically-operated means for admitting pressure to opposite ends of the cylinder for sliding the piston in opposite directions to move the pressure-members toward each other to contact the container and locate it in position for operation thereon and to withdraw said members from the sides of the container after each stitching operation is completed.

7. In a machine for sealing containers, means for supporting the containers, stapling means mounted above a container on the supporting means, pressure-members movable for contacting the sides of the container to position it for operation thereon by the stapling means, a cylinder for fluid pressure, a piston reciprocable by pressure in said cylinder, a four-way valve for controlling the pressure in the cylinder, conduits leading from said valve to opposite ends of the cylinder, and electrically-operated means for automatically actuating said valve to direct the pressure in the cylinder for moving the piston in one direction to carry the pressure-members into contact with the container and alternately in the opposite direction to withdraw the pressure-members from the sides of the container.

8. In a machine for sealing containers, means for supporting the containers, stapling means mounted above said supporting means, pressure-means movable to contact the sides of a container to locate and hold it in position to be operated upon by said stapling means, means connecting said pressure-members to move toward and away from each other, a fluid-pressure cylinder, a piston reciprocable in said cylinder for operating said connecting means to shift said pressure-members, a valve for admitting fluid-pressure at opposite ends of said cylinder, a source of pressure, and electrical means for operating said valve to direct the pressure first to one end of said cylinder to move the piston in one direction and then to the opposite end of said cylinder to move the piston in the opposite direction.

9. In a machine of the type indicated, a table for supporting containers, a stitcher-head movably mounted above said table, an endless chain for raising and lowering the stticher-head relatively to the table, power-operated means for traveling said chain to raise the stitcher-head, means to release said power-operated means to allow the chain to travel for lowering the stitcher-head, means for connecting and disconnecting said power-operated means from the chain-traveling means, a cylinder for hydraulic fluid, a piston in said cylinder, means connecting said piston to move inwardly of the cylinder with the downward movement of the stitcher-head to cushion the descent of said head toward the container, and valve-means to maintain fluid in the bottom of said cylinder to resiliently support the stitcher-head in operative relation to a container on the table.

10. In a machine of the type indicated, a support for containers, a stitcher-head for sealing the containers, a carriage for slidably mounting said stitcher-head to move relatively to a container on the support, an endless chain connected to said carriage, sprockets for traveling said chain to move said carriage upwardly for raising the stitcher-head above said support, a motor for driving one of said sprockets, clutch-means for connecting said motor to rotate said driving sprocket, a solenoid for operating said clutch-means, an electrical circuit, a switch in said circuit normally closed for energizing said solenoid, and means engageable by the carriage to actuate the switch for opening said circuit and de-energizing the solenoid to disengage the clutch-means as the stitcher-head approaches the end of its upward motion.

11. In a machine of the type indicated, a support for containers, means for slidably supporting a stitcher-head to move up and down relatively to a container on said support, a carriage for slidably mounting said stitcher-head, an endless chain connected to said carriage, a sprocket for traveling said chain, a motor for driving said sprocket, clutch-means for connecting said motor to drive said sprocket, a solenoid for operating said clutch-means, an electrical circuit for energizing said solenoid, a switch in said circuit, contact-means engageable by the carriage to actuate the switch for opening said circuit and de-energizing the solenoid to cause disengagement of the clutch-means as the stitcher-head approaches the end of its upward motion, and means for adjusting the position of said contact-means to control the extent of upward travel of the stitcher-head.

12. In a machine of the type indicated, a table for supporting a container to feed thereon, a column rising above said table, a trackway on said column, a carriage slidable on said trackway, a stitcher-head supported by said carriage to move up and down relatively to a container on the table, a chain connected to the carriage, a shaft for traveling said chain to slide the carriage and lift the stitcher-head above the table, an electric motor, a clutch connecting said motor to drive the shaft for traveling said chain, a solenoid for operating said clutch, an electrical circuit, a switch in said circuit normally closed for energizing said solenoid, a rod for operating said switch, a collar adjustable on said rod, a spring surrounding the rod below the collar, and means on the carriage adapted to compress and load said spring to cause it to shift the rod and throw the switch to de-energize the solenoid for declutching the motor-drive from the shaft.

13. In a machine of the type indicated, a support for containers, a stapling machine movable up and down above a container on said support, means for raising said stapling machine above the container, means for releasing said raising means to permit the stapling machine to move down by gravity into proximity to the container, a cylinder for hydraulic fluid, a piston in said cylinder connected to move with said stapling machine to cushion its downward movement, a control-valve for bleeding the fluid from the bottom of said cylinder, means to by-pass the fluid to the upper end of said cylinder, and means controlled by contact with the container for closing said control-valve to resiliently sustain the stapling means in its lowermost position.

14. In a machine embodying stapling means for sealing the closures of a container, a support for the container, means for movably mounting said stapling means above said support, means for causing said stapling means to move downwardly into operative relationship with respect to said container, pressure-members slidable on said support to contact said container to locate it relatively to said stapling means and to release said pressure-members therefrom to permit said container to be fed forwardly on said support, a cylinder, a piston reciprocable in said cylinder for moving said pressure-means toward and away from said container, a four-way valve for admitting pressure alternately to opposite ends of said cylinder, a solenoid for operating said valve, a source of current in circuit with said solenoid, a switch in said circuit, and means carried by said stapling means for contacting said container to close said switch.

15. In a machine for sealing containers, a support for the containers, stapling means movable toward and away from a container on said support, stationary stapling means mounted below the support, a motor for driving the movable stapling means, a motor for driving the stationary stapling means, a trip-member carried by the movable stapling means for contact with the top of the container, means actuated by said trip-member for connecting the motor to drive the upper stapling means, means for connecting the motor to drive the stationary stapling means, a solenoid for actuating said last-mentioned means for connecting the motor to drive the stationary stapling means, electrical means for operating said drive-connnecting means, and a switch actuated by said trip-member to energize said solenoid.

16. In a machine for sealing cartons, a support for the cartons, a stitcher-head mounted above said support to move toward and away from a carton thereon, a second stitcher-head mounted below the support, an electric motor for each stitcher-head, separate clutch-means for connecting said motors to drive their respective stitcher-heads, means for mechanically connecting said clutch-means to start the operation of the stitcher-heads, a trip-member carried by the movable stitcher-head for contact with the carton as said head moves into operative relation with respect thereto, electrical means actuated by said trip-member for operating the mechanical means to connect the clutch-means to drive the movable stitcher-head, electrical means for actuating the clutch-means to connect the motor to drive the lower stitcher-head, and means operated by the starting of the movable stitcher-head to energize said electrical means.

17. In a machine for sealing cartons and like containers, means for supporting a container to feed therealong, a stitcher-head for applying staples to the container, means for mounting said stitcher-head above said support to adapt it to be moved downwardly into position for operating on said container, power-means for operating said stitcher-head to stitch the flaps of a container, contact-means on said stitcher-head for engaging the container, means actuated by said contact-means to connect said power-means for operating the stitcher-head, and means operated automatically for raising the stitcher-head above the container after each staple is applied thereto to release said contact-means and disconnect the power-means from said stitcher-head whereby to permit the container to be fed forwardly for progressively applying a series of staples thereto.

18. In a machine for sealing cartons and other containers, a table for supporting a container to feed therealong, a stitcher-head mounted to move vertically relatively to said table, means for raising said stitcher-head above the table, means for releasing said raising means to cause gravity to lower said stitcher-head toward a container supported on the table, power-operated means for driving said stitcher-head, contact-means carried by said stitcher-head for engagement with the container during its descent, means actuated by said contact-means for connecting said power-operated means to drive the stitcher-head, and means for automatically operating said raising means to lift said stitcher-head above the container after each stapling operation to disengage said contact-means therefrom and disconnect the power-operated means whereby to adapt the container to be fed forwardly to apply another staple thereto.

19. In a machine of the type indicated, a table for supporting containers to feed therealong, a stitcher-head supported above said table, pressure-members mounted above said table to move laterally thereof, means connected to said pressure-members for moving them alternately toward each other and away from each other, and pneumatically-operated means for operating said means connected to said pressure-members to move said members into contact with the sides of a container to locate it for operation thereon by the stitcher-head, and to thereafter withdraw said members from the container to adapt it to be fed along said table.

20. In a machine of the type indicated, a table for supporting a container to feed therealong, a stitcher-head supported above said table for operation to apply staples to the container, pressure-members mounted above said table for movement laterally toward and away from a container thereon, means connected to said pressure-members for moving them relatively to each other, a cylinder, a piston slidable in said cylinder and connected to said means for moving the pressure-members, and automatically-operated means for admitting pressure alternately to the opposite ends of the cylinder for sliding the piston in different directions to move the pressure-members toward each other into contact with the sides of the container for locating it in position to be operated upon by said stitcher-head, and to thereafter withdraw said members from the sides of the container after each stapling operation is completed.

References Cited in the file of this patent

UNITED STATES PATENTS

| | | |
|---|---|---|
| 1,028,238 | Lyon | June 4, 1912 |
| 1,812,189 | Allen | June 30, 1931 |
| 1,959,609 | Bliss | May 22, 1934 |
| 2,024,750 | Sims | Dec. 17, 1935 |
| 2,224,599 | Hingston | Dec. 10, 1940 |
| 2,264,776 | Spiller | Dec. 2, 1941 |
| 2,539,599 | Tubbs | Jan. 30, 1951 |
| 2,625,682 | Cristiano | Jan. 20, 1953 |
| 2,644,944 | Kott | July 14, 1953 |